(12) United States Patent
Ryu et al.

(10) Patent No.: US 12,225,362 B2
(45) Date of Patent: Feb. 11, 2025

(54) ELECTRONIC DEVICE FOR TRANSMITTING AUDIO DATA TO PLURALITY OF EXTERNAL ELECTRONIC DEVICES, AND METHOD FOR CONTROLLING SAME

(71) Applicant: Samsung Electronics Co., Ltd., Suwon-si (KR)

(72) Inventors: Kyusang Ryu, Suwon-si (KR); Jinho Kim, Suwon-si (KR); Hongbum Park, Suwon-si (KR); Gwanyeol Lee, Suwon-si (KR); Sungjun Choi, Suwon-si (KR); Sungpill Hwang, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/695,254

(22) Filed: Mar. 15, 2022

(65) Prior Publication Data

US 2022/0210559 A1 Jun. 30, 2022

Related U.S. Application Data

(63) Continuation of application No. PCT/KR2020/013622, filed on Oct. 7, 2020.

(30) Foreign Application Priority Data

Oct. 8, 2019 (KR) .......................... 10-2019-0124920

(51) Int. Cl.
| H04R 3/12 | (2006.01) |
| G06F 3/16 | (2006.01) |
| H04M 1/72412 | (2021.01) |

(52) U.S. Cl.
CPC ............... *H04R 3/12* (2013.01); *G06F 3/165* (2013.01); *H04M 1/72412* (2021.01); *H04R 2420/05* (2013.01); *H04R 2430/01* (2013.01)

(58) Field of Classification Search
None
See application file for complete search history.

(56) References Cited

U.S. PATENT DOCUMENTS

| 2003/0100274 A1 | 5/2003 | Brown | |
| 2012/0051560 A1* | 3/2012 | Sanders | H03G 1/02 |
| | | | 381/105 |

(Continued)

FOREIGN PATENT DOCUMENTS

| KR | 10-2013-0048794 A | 5/2013 |
| KR | 10-2016-0023166 A | 3/2016 |

(Continued)

OTHER PUBLICATIONS

Korean Office Action dated Feb. 28, 2024, issued in Korean Application No. 10-2019-0124920.

*Primary Examiner* — James K Mooney
(74) *Attorney, Agent, or Firm* — Jefferson IP Law, LLP

(57) ABSTRACT

An electronic device for transmitting audio data to a plurality of external electronic devices, and a method for controlling same are provided. The electronic device includes an audio module, a communication module, and a processor. The processor can control the communication module to identify connections between the electronic device and the plurality of external electronic devices, identify properties of each of the plurality of external electronic devices connected to the electronic device, and control the audio module and the communication module so as to transmit audio data having a designated volume level to each of the plurality of external electronic devices accord- (Continued)

ing to the identified properties of the plurality of external electronic devices.

7 Claims, 27 Drawing Sheets

(56) References Cited

U.S. PATENT DOCUMENTS

| | | | |
|---|---|---|---|
| 2012/0269359 A1 | 10/2012 | Spittle | |
| 2016/0056782 A1 | 2/2016 | Lee | |
| 2018/0279050 A1* | 9/2018 | Ryu | ........................ G10L 19/22 |
| 2020/0348902 A1 | 11/2020 | Park et al. | |
| 2020/0379713 A1* | 12/2020 | Carrigan | ............... G06F 3/0481 |

FOREIGN PATENT DOCUMENTS

| | | | |
|---|---|---|---|
| KR | 10-2018-0108310 A | 10/2018 | |
| KR | 10-2019-0068317 A | 6/2019 | |

* cited by examiner

ELECTRONIC DEVICE FOR TRANSMITTING AUDIO DATA TO PLURALITY OF EXTERNAL ELECTRONIC DEVICES, AND METHOD FOR CONTROLLING SAME

CROSS-REFERENCE TO RELATED APPLICATION(S)

This application is a continuation application, claiming priority under § 365(c), of an International application No. PCT/KR2020/013622, filed on Oct. 7, 2020, which is based on and claims the benefit of a Korean patent application number 10-2019-0124920, filed on Oct. 8, 2019, in the Korean Intellectual Property Office, the disclosure of which is incorporated by reference herein in its entirety.

BACKGROUND

1. Field

The disclosure relates to an electronic device for transmitting audio data to a plurality of external electronic devices, and a method of controlling the same.

2. Description of Related Art

More services and more additional functions have been provided through electronic devices, for example, a portable electronic device such as a smart phone. In order to increase the utility of electronic devices and satisfy the needs of various users, communication service providers or electronic device manufacturers are competitively developing electronic devices to provide various functions and differentiate them from other companies. Accordingly, various functions provided through the electronic device are also increasingly advanced.

The above information is presented as background information only to assist with an understanding of the disclosure. No determination has been made, and no assertion is made, as to whether any of the above might be applicable as prior art with regard to the disclosure.

SUMMARY

An electronic device may provide a media volume synchronization function. In the disclosure, the "media volume synchronization function" is a function of setting the volume of a sound from the electronic device and the volume of a sound output from an external electronic device to be equal to each other. The media volume synchronization function may be referred to as an "absolute volume feature". For example, in the disclosure, the term "supporting an absolute volume feature" may mean "supporting the media volume synchronization function" or "the media volume synchronization function being on/off by an electronic device (e.g., an electronic device 201 of FIG. 2)". When a plurality of external electronic devices (e.g., an external electronic device that supports the media volume synchronization function and an external electronic device that does not support the media volume synchronization function) are connected to the electronic device with the media volume synchronization function turned on, volume control is impossible for each individual external electronic device, and thus a user should turn off the media volume synchronization function to control the volume of each external electronic device through the electronic device. However, when the media volume synchronization function is switched from an ON state to an OFF state, the output volumes of the external electronic devices connected to the electronic device may be lower than a volume set by the user, depending on the connected external electronic devices (e.g., when an external electronic device supporting the media volume synchronization function and an external electronic device not supporting the media volume synchronization function are connected to the electronic device).

Aspects of the disclosure are to address at least the above-mentioned problems and/or disadvantages and to provide at least the advantages described below. Accordingly, an aspect of the disclosure is to provide an electronic device for, even though a plurality of external electronic devices (e.g., an external electronic device 202 of FIG. 2) are connected to the electronic device (e.g., the electronic device 201 of FIG. 2), controlling output of audio content at a user-intended volume level.

Another aspect of the disclosure is to provide a method of controlling an electronic device for, even though a plurality of external electronic devices (e.g., the external electronic device 202 of FIG. 2) are connected to the electronic device (e.g., the electronic device 201 of FIG. 2), controlling output of audio content at a user-intended volume level.

Additional aspects will be set forth in part in the description which follows and, in part, will be apparent from the description, or may be learned by practice of the presented embodiments.

In accordance with an aspect of the disclosure, an electronic device is provided. The electronic device includes an audio module, a communication module, and a processor operatively coupled to the audio module and the communication module. The processor may be configured to control the communication module to identify connection between the electronic device and a plurality of external electronic devices, identify an attribute of each of the plurality of external electronic devices connected to the electronic device, and control the audio module and the communication module to transmit audio data having a specified volume level to each of the plurality of external electronic devices according to the identified attributes of the plurality of external electronic devices.

In accordance with another aspect of the disclosure, a method of controlling an electronic device is provided. The method includes identifying connection between the electronic device and a plurality of external electronic devices, identifying an attribute of each of the plurality of external electronic devices connected to the electronic device, and transmitting audio data having a specified volume level to each of the plurality of external electronic devices according to the identified attributes of the plurality of external electronic devices.

In accordance with another aspect of the disclosure, an electronic device is provided. The electronic device includes an audio module, a communication module, and a processor operatively coupled to the audio module and the communication module. The processor may be configured to identify connection of a plurality of external electronic devices, identify switching of a media volume synchronization function to an OFF state in a state where the plurality of external electronic devices are connected to the electronic device, and change volume levels of the plurality of external electronic devices to a first volume level, change a volume level of the electronic device to a second volume level, and transmit audio data having the second volume level to each of the plurality of external electronic devices, in response to the identification of the switching of the media volume synchronization function to the OFF state.

According to various embodiments of the disclosure, even though a plurality of external electronic devices (e.g., the external electronic device 202 of FIG. 2) are connected to an electronic device (e.g., the electronic device 201 of FIG. 2), the electronic device may be controlled to output audio content at a user-intended volume level.

According to various embodiments of the disclosure, even though a plurality of external electronic devices (e.g., the external electronic device 202 of FIG. 2) are connected to an electronic device (e.g., the electronic device 201 of FIG. 2), an electronic device may be controlled such that there is no need for switching a media volume synchronization function to an OFF state in order to control the volume of each external electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
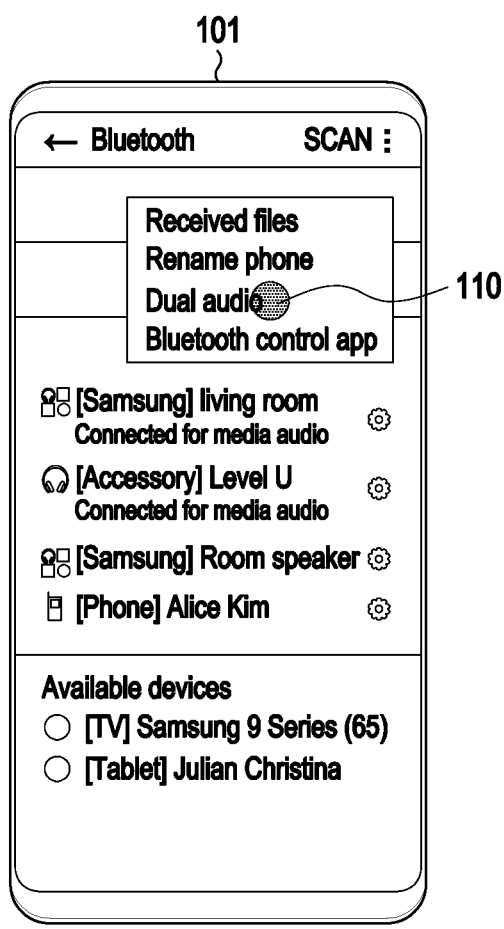
FIG. 1A is a diagram illustrating a function or operation of receiving a user input for activating a dual audio function or operation.
Figure 1B:
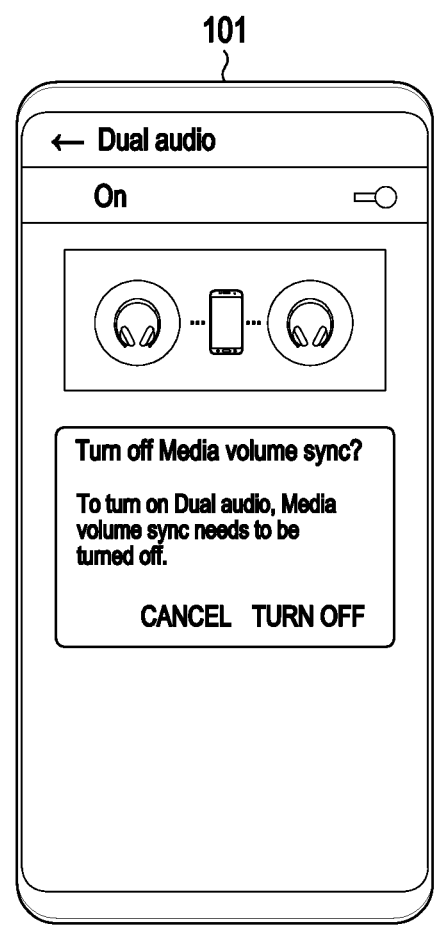
FIG. 1B is a diagram illustrating a function or operation of outputting a menu for turning off a media volume synchronization function, when the dual audio function is activated.
Figure 1C:
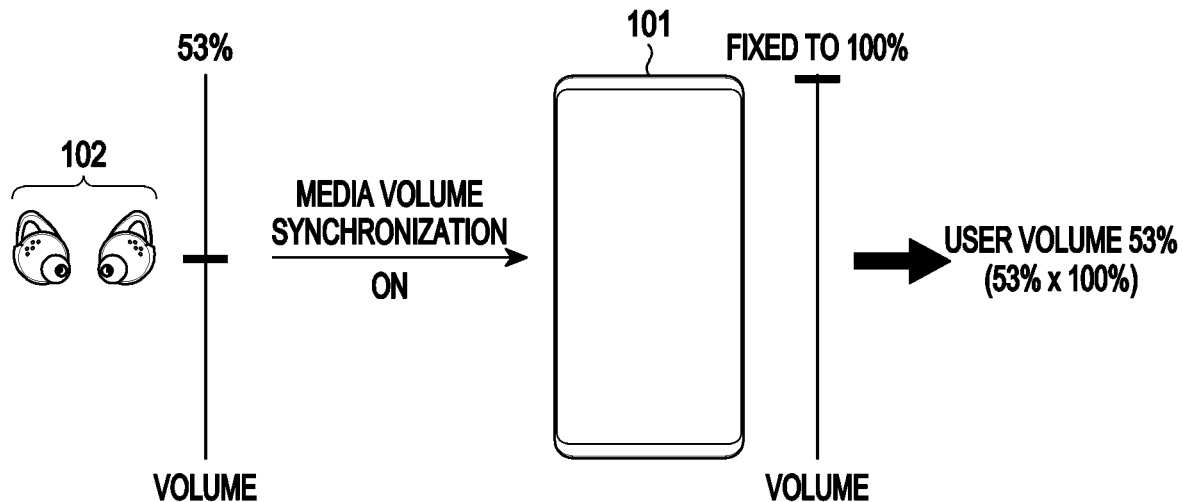
FIGS. 1C and 1D are diagrams illustrating a case in which the media volume synchronization function of an electronic device is set to an ON state.
Figure 1D:
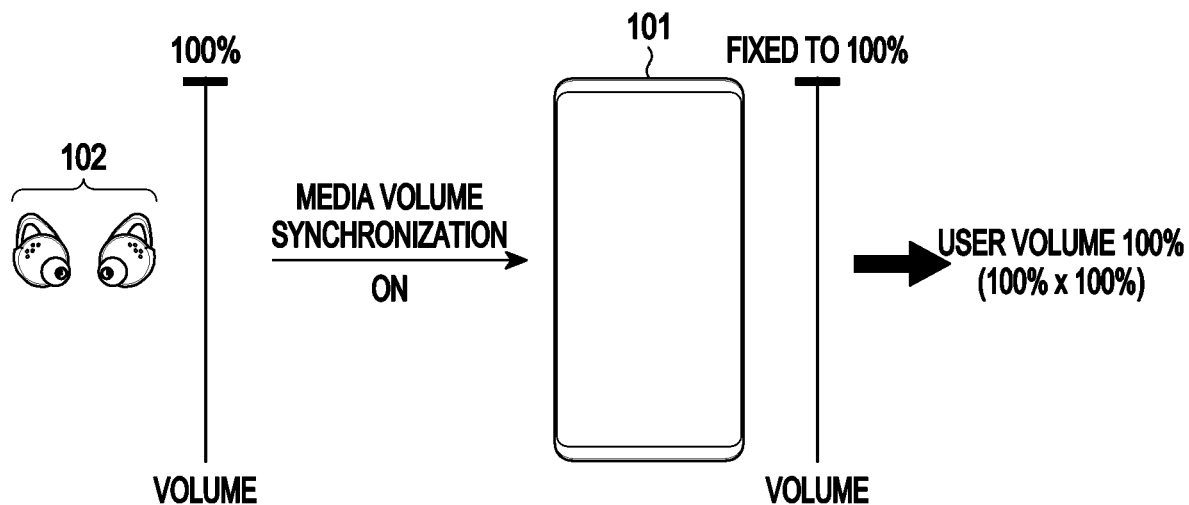
Figure 1E:
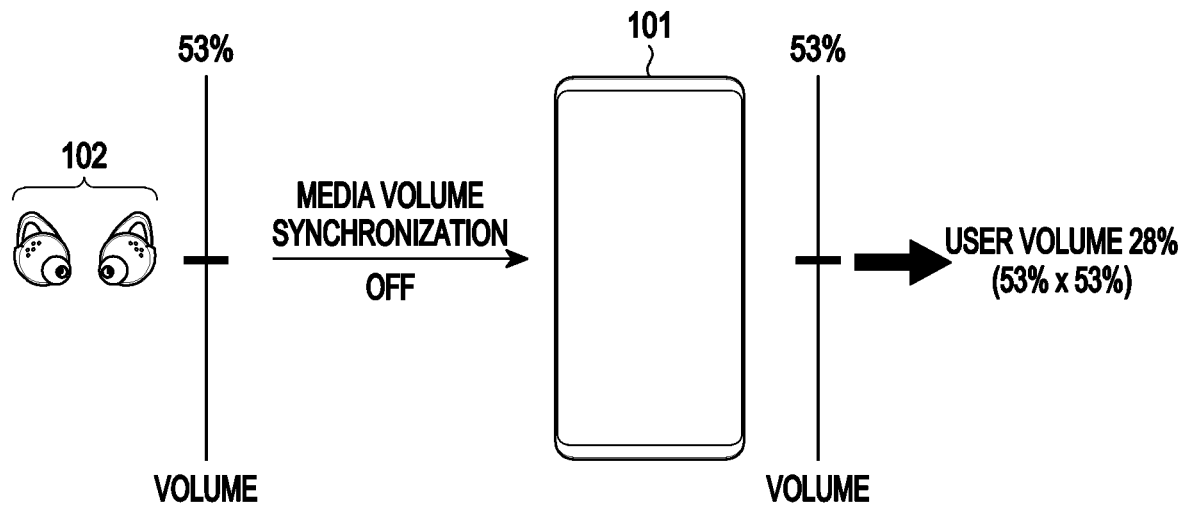
FIGS. 1E and 1F are diagrams illustrating a case in which the media volume synchronization function of the electronic device is set to an OFF state.
Figure 1F:
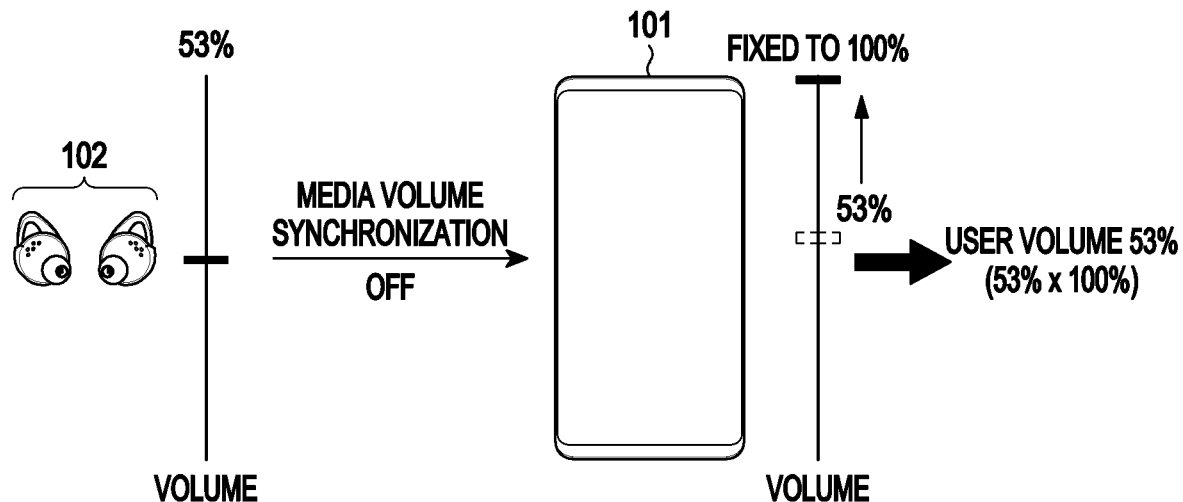

FIG. 1A is a diagram illustrating a function or operation of receiving a user input for activating a dual audio function or operation according to an embodiment of the disclosure. FIG. 1B is a diagram illustrating a function or operation of outputting a menu for turning off a media volume synchronization function, when the dual audio function is activated according to an embodiment of the disclosure. FIGS. 1C and 1D are diagrams illustrating a case in which the media volume synchronization function of a main electronic device is set to an ON state according to various embodiments of the disclosure. FIGS. 1E and 1F are diagrams illustrating a case in which the media volume synchronization function of the main electronic device is set to an OFF state according to various embodiments of the disclosure. In the disclosure, the term "dual audio function or operation" may also be briefly referred to as "dual audio mode".

An electronic device may provide various functions. For example, the electronic device may simultaneously transmit audio data to a plurality of external electronic devices connected to the electronic device. Accordingly, audio content corresponding to the audio data may be simultaneously output from the plurality of external electronic devices. In the disclosure, a function/operation of transmitting audio data to a plurality of external electronic devices or a function/operation of outputting the same audio content from a plurality of external electronic devices may be referred to as "dual audio".

Referring to FIG. 1A, a user of a main electronic device 101 may select a menu 110 for activating the dual audio function in order to use the dual audio function. When the user selects the menu for activating the dual audio function, the main electronic device 101 may output a guide message indicating that the dual audio function or operation is activated.

Referring to FIG. 1B, the main electronic device 101 may output a message indicating that the media volume synchronization function should be turned off, when the dual audio function is activated. The volume of audio content output from an external electronic device 102 supporting the absolute volume feature may be determined to be a combination of the volume level of data transmitted from the main electronic device 101 to the external electronic device 102 and the volume level of the external electronic device 102.

Referring to FIG. 1C, when the volume level of the external electronic device 102 supporting the absolute volume feature is set to 53% by the user and the volume level of audio data (e.g., the volume level of the electronic device 100) transmitted from the main electronic device 101 to the external electronic device 102 is 100%, the volume (e.g., user volume) of audio content output from the external electronic device 102 may be 53%. When the media volume synchronization function is set to the ON state, the volume level of audio data transmitted from the main electronic device 101 to the external electronic device 102 may be fixed to 100% to output the same volume as the volume of the external electronic device 102 set by the user through the main electronic device 101. Referring to FIG. 1D, when the media volume synchronization is in the ON state, the volume level of the main electronic device 101 may be fixed to 100% as in FIG. 1C. According to various embodiments of the disclosure, when the media volume synchronization is ON and the volume level of the external electronic device 102 set by the user is 100%, the volume level of the audio content output from the external electronic device 102 may be 100%.

Referring to FIG. 1E, when the media volume synchronization function is turned off according to connection of a plurality of external electronic devices supporting the absolute volume feature, the volume level of the main electronic device 101 may be changed to a volume level (e.g., 53%) set for the external electronic device 102. In this case, the output volume of the external electronic device 102 may be 28%, which is a combination of the volume level of the main electronic device 101 and the volume level of the external electronic device 102. In other words, as a plurality of external electronic devices are connected to the electronic device 100, audio content may be transmitted from the plurality of external electronic devices at a volume level (e.g., 28%) lower than a user-desired volume level (e.g., 53%), thus causing inconvenience to the user.

Moreover, even when the user changes the volume level of the electronic device 100 to 100%, the volume level of audio content output from the external electronic device 102 is inconveniently limited to 53%.

Figure 2:
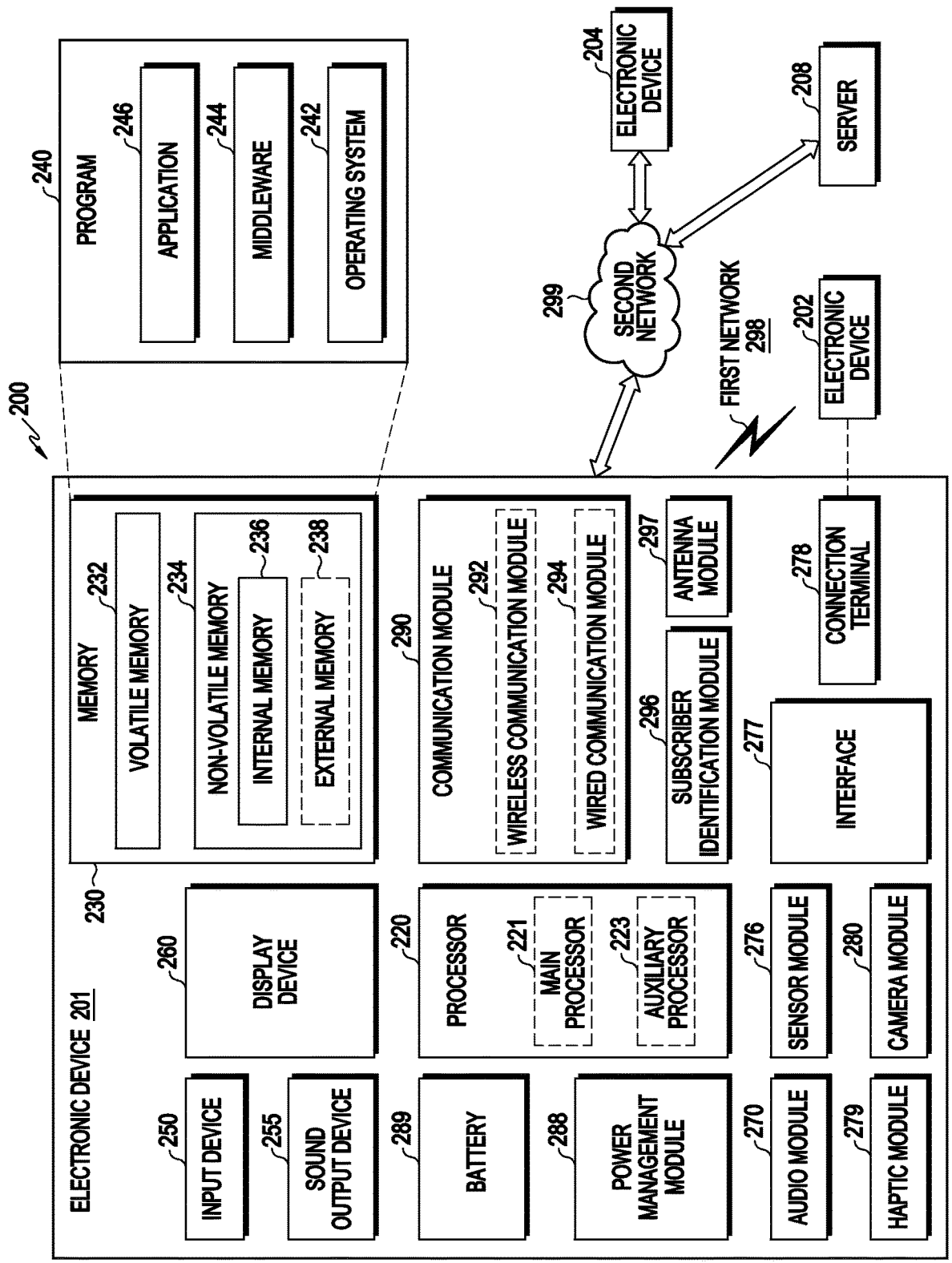
FIG. 2 is a block diagram of an electronic device in a network environment according to an embodiment of the disclosure.

FIG. 2 is a block diagram illustrating an electronic device 201 in a network environment 200 according to an embodiment of the disclosure.

Referring to FIG. 2, the electronic device 201 in the network environment 200 may communicate with an external electronic device 202 via a first network 298 (e.g., a short-range wireless communication network), or an external electronic device 204 or a server 208 via a second network 299 (e.g., a long-range wireless communication network). According to an embodiment, the electronic device 201 may communicate with the external electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 222 may be adapted to consume less power than the main processor 221, or to be specific to a specified function. The auxiliary processor 222 may be implemented as separate from, or as part of the main processor 221.

The auxiliary processor 222 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 222 (e.g., an image signal processor or a communication processor) may be implemented as part of another component (e.g., the camera module 280 or the communication module 290) functionally related to the auxiliary processor 222.

The memory 230 may store various data used by at least one component (e.g., the processor 220 or the sensor module 276) of the electronic device 201. The various data may include, for example, software (e.g., the program 240) and input data or output data for a command related thereto. The memory 230 may include at least one of the volatile memory 232 or the non-volatile memory 234. The non-volatile memory 234 may include at least one of internal memory 238 or external memory 328.

The program 240 may be stored in the memory 230 as software, and may include, for example, an operating system (OS) 242, middleware 244, or an application 246.

The input device 250 may receive a command or data to be used by another component (e.g., the processor 220) of the electronic device 201, from the outside (e.g., a user) of the electronic device 201. The input device 250 may include, for example, a microphone, a mouse, a keyboard, or a digital pen (e.g., a stylus pen).

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an external electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the external electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the external electronic device 202). According to an embodiment, the connecting terminal 278 may include, for example, a HDMI connector, a USB connector, an SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the external electronic device 202, the external electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., printed circuit board (PCB)). According to an embodiment, the antenna module 297 may include a plurality of antennas. In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the external electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

Figure 3:
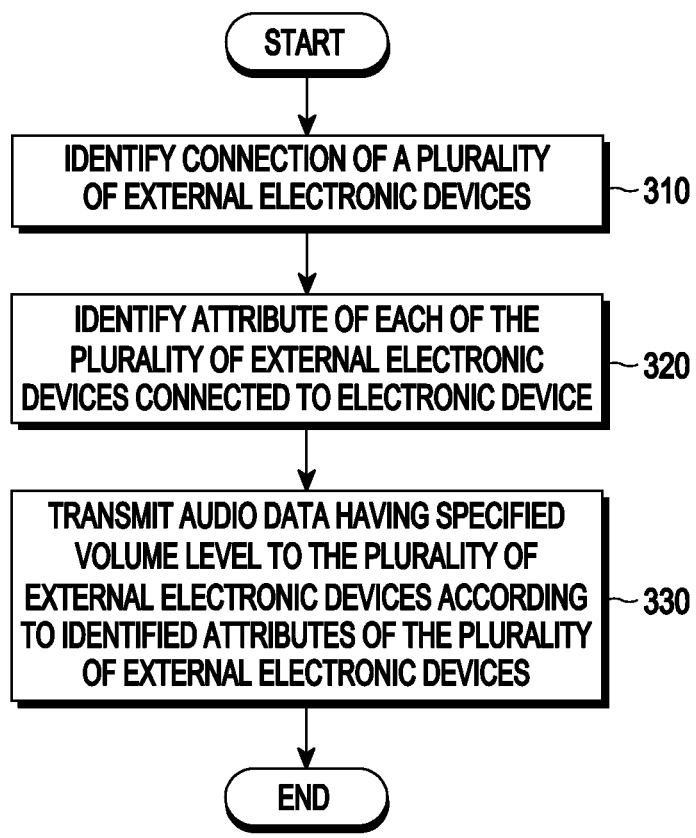
FIG. 3 is a diagram a method of operating an electronic device according to an embodiment of the disclosure.
Figure 4A:
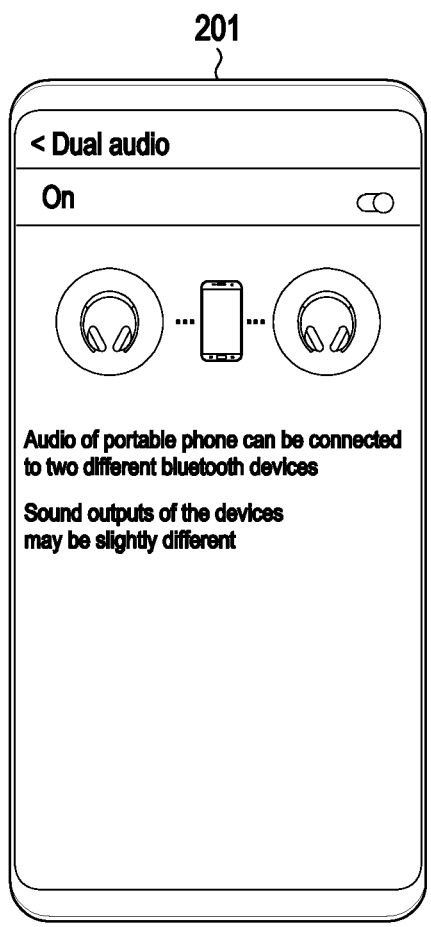
FIG. 4A is a diagram illustrating a guide message output to an electronic device, when the dual audio function or operation is activated according to an embodiment of the disclosure.
Figure 4B:
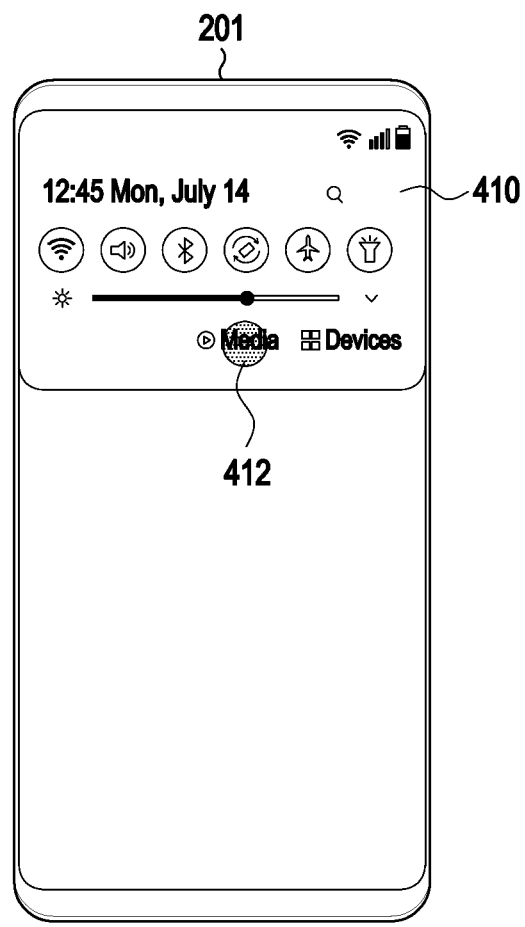
FIGS. 4B, 4C, and 4D are diagrams illustrating a function or operation of activating the dual audio function or operation according to various embodiments of the disclosure.
Figure 4C:
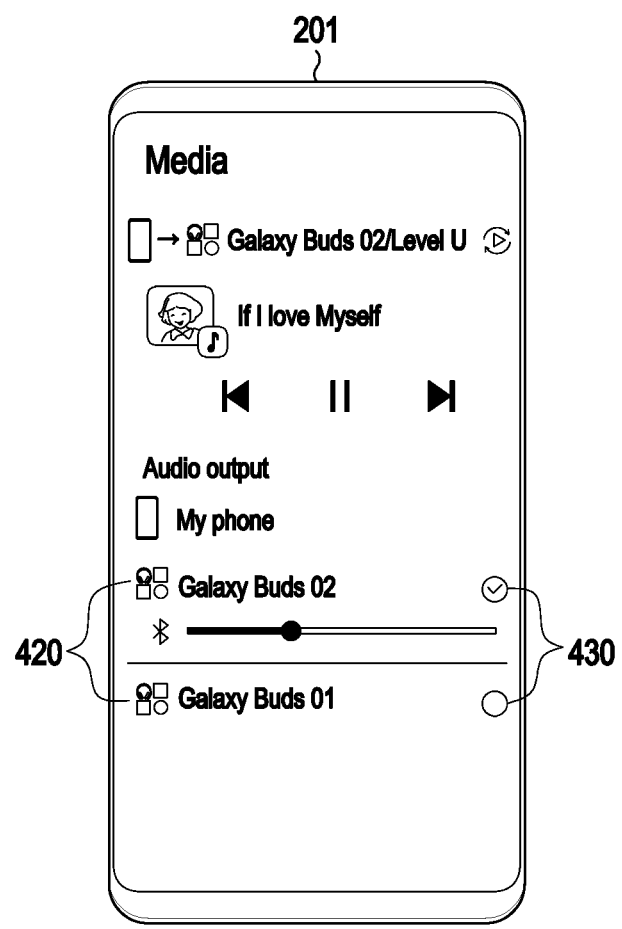
Figure 4D:
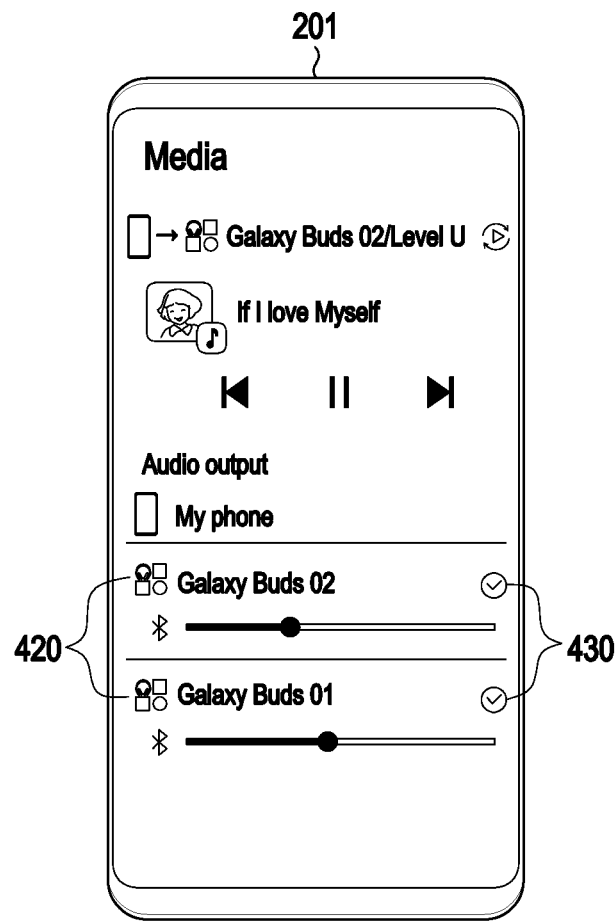
Figure 4E:
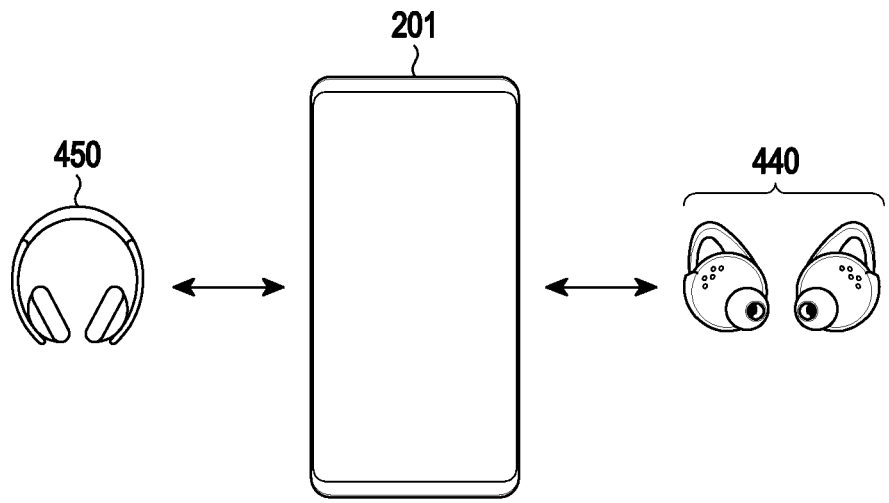
FIG. 4E is a diagram illustrating a state in which a plurality of external electronic devices are connected to the electronic device according to an embodiment of the disclosure.

FIG. 3 is a diagram illustrating a method of operating an electronic device (e.g., the electronic device 201 of FIG. 2) according to an embodiment of the disclosure. FIG. 4A is a diagram illustrating a guide message output from an electronic device, when the dual audio function or operation is activated according to an embodiment of the disclosure. FIGS. 4B to 4D are diagrams illustrating a function or operation of activating the dual audio function or operation according to various embodiments of the disclosure. FIG. 4E is a diagram illustrating a state in which a plurality of external electronic devices are connected to an electronic device according to an embodiment of the disclosure.

Referring to FIG. 3, an electronic device (e.g., the electronic device 201 of FIG. 2) according to various embodiments of the disclosure may identify that a plurality of external electronic devices (e.g., the external electronic device of FIG. 2) have been connected to the electronic device in operation 310. For example, the electronic device (e.g., the electronic device 201 of FIG. 2) according to various embodiments of the disclosure may identify the external electronic devices by short-range communication (e.g., Bluetooth communication). For example, the electronic device 201 according to various embodiments of the disclosure may identify whether at least one external electronic device supports an advanced audio distribution profile (A2DP) and/or an audio video remote control profile (AVRCP) through service discovery, and perform A2DP and AVRCP profile connection with the plurality of external electronic devices through short-range communication. Alternatively, when a specific application (e.g., a music application) is running in the electronic device 201, the electronic device 201 may establish connections with the plurality of external electronic devices.

Referring to FIG. 4A, when the electronic device 201 according to various embodiments of the disclosure is connected to a plurality of external electronic devices (e.g., the external electronic device 202 of FIG. 2), the electronic device 201 may output a guide message indicating that the plurality of external electronic devices (e.g., the external electronic device 202 of FIG. 2) have been connected to the electronic device 201.

Referring to FIG. 4B, the electronic device 201 according to various embodiments of the disclosure may display a quick panel 410 according to a user input. The quick panel 410 according to various embodiments of the disclosure may refer to a user interface displayed on the electronic device 201 when the user drags an upper edge portion of the electronic device 201 downward on a home screen. Various icons for controlling the electronic device 201 may be displayed on the quick panel 410 according to various embodiments of the disclosure. The electronic device 201 according to various embodiments of the disclosure may receive a selection input for a specific menu (e.g., a "media" menu) 412 included in the quick panel 410.

Referring to FIG. 4C, the electronic device 201 according to various embodiments of the disclosure may display information 420 about the plurality of external electronic devices (e.g., device name information and current volume state information) and user interfaces 430 for activating the dual audio function or operation in response to the selection input for the specific menu (e.g., the "media" menu) 412 included in the quick panel 410. Upon receipt of a user input on a user interface 430 for activating the dual audio function (e.g., a user touch input for a check box), the electronic device 201 according to various embodiments of the disclosure may activate the dual audio function or operation.

Referring to FIG. 4D, the electronic device 201 according to various embodiments of the disclosure may additionally display an indicator (e.g., a check mark) on the user interface 430 for activating the dual audio function or operation, to indicate that the dual audio function or operation has been activated. When identifying that another external electronic device has been connected, with an external electronic device already connected to the electronic device 201, the electronic device 201 according to various embodiments of the disclosure may output a pop-up message indicating whether to activate the dual audio function or operation.

The plurality of external electronic devices according to various embodiments of the disclosure may include at least one of an external electronic device 440 supporting the absolute volume feature or an external electronic device 450 not supporting the absolute volume feature.

Referring to FIG. 4E, for example, the external electronic device 440 supporting the absolute volume feature and the external electronic device 450 not supporting the absolute volume feature are connected to the electronic device 201. The plurality of external electronic devices (e.g., the external electronic device 202 of FIG. 2) according to various embodiments of the disclosure may be connected to the electronic device through short-range communication (e.g., Bluetooth communication). When the plurality of external electronic devices (e.g., the external electronic device 202 of FIG. 2) are connected to the electronic device (e.g., the electronic device 201 of FIG. 2) according to various embodiments of the disclosure, a guide message indicating that the plurality of external electronic devices (e.g., the external electronic device 202 of FIG. 2) have been connected to the electronic device (e.g., the electronic device 201 of FIG. 2) may be output, as illustrated in FIG. 4A. According to various embodiments of the disclosure, the dual audio function or operation may be activated according to a user input, as illustrated in FIGS. 4B to 4D.

In operation 320, the electronic device (e.g., the electronic device 201 of FIG. 2) according to various embodiments of the disclosure may identify an attribute of each of the plurality of external electronic devices (e.g., the external electronic device 202 of FIG. 2) connected to the electronic device (e.g., the electronic device 201 of FIG. 2). The attribute according to various embodiments of the disclosure may include at least one of an attribute supporting the absolute volume feature or an attribute not supporting the absolute volume feature. The electronic device (e.g., the electronic device 201 of FIG. 2) according to various embodiments of the disclosure may receive an identifier indicating whether the absolute volume feature is supported from each of the plurality of external electronic devices (e.g., the external electronic device 202 of FIG. 2). Alternatively, the electronic device 201 according to various embodiments of the disclosure may pre-store information indicating whether the plurality of external electronic devices (e.g., the external electronic device 202 of FIG. 2) support the absolute volume feature. In this case, when an external electronic device is connected to the electronic device, the electronic device 201 according to various embodiments of the disclosure may identify whether the external electronic device supports the absolute volume feature by using information (e.g., product information about the external electronic device) received from the external electronic device.

The electronic device (e.g., the electronic device 201 of FIG. 2) according to various embodiments of the disclosure may identify whether the plurality of external electronic devices (e.g., the external electronic device 202 of FIG. 2) support the absolute volume feature by using the received identifiers.

In operation 330, the electronic device (e.g., the electronic device 201 of FIG. 2) according to various embodiments of the disclosure may transmit audio data having specified volume levels according to the identified attributes of the plurality of external electronic devices (e.g., the external electronic device 202 of FIG. 2) to the plurality of external electronic devices. For example, the electronic device (e.g., the electronic device 201 of FIG. 2) according to various embodiments of the disclosure may transmit audio data having a first specified volume level (e.g., a maximum volume level) to at least one external electronic device (e.g., the electronic device 201 of FIG. 2) supporting the absolute volume feature. The electronic device (e.g., the electronic device 201 of FIG. 2) according to various embodiments of the disclosure may transmit audio data having a second specified volume level (e.g., a volume level adjusted to the volume level of at least one external electronic device that does not support the volume feature) to at least one external electronic device that does not support the absolute volume feature. According to various embodiments of the disclosure, the first specified volume level and the second specified volume level may be equal or different from each other. The electronic device (e.g., the electronic device 201 of FIG. 2) according to various embodiments of the disclosure may adjust the audio data by using volume level data for the at least one electronic device (e.g., the electronic device 201 of FIG. 2) that does not support the absolute volume feature, stored in the electronic device (e.g., the electronic device 201 of FIG. 2). The volume level of audio data for the at least one external electronic device (e.g., the external electronic device 202 of FIG. 2) that does not support the absolute volume feature according to various embodiments of the disclosure may be transmitted to the electronic device, at a time when the at least one external electronic device that does not support the absolute volume feature is connected to the electronic device (e.g., the electronic device 201 of FIG. 2) through short-distance communication or at a time when a specific application (e.g., a music application) is executed in the electronic device. The volume level data for the at least one external electronic device that does not support the absolute volume feature according to various embodiments of the disclosure may be stored in the electronic device in the form of a volume table. The function or operation of adjusting a volume level according to various embodiments of the disclosure may be controlled by at least one module of a processor (e.g., the processor 220 of FIG. 2) an audio module (e.g., the audio module 270 of FIG. 2), or a communication module (e.g., the communication modules 290 of FIG. 2).

Figure 5:
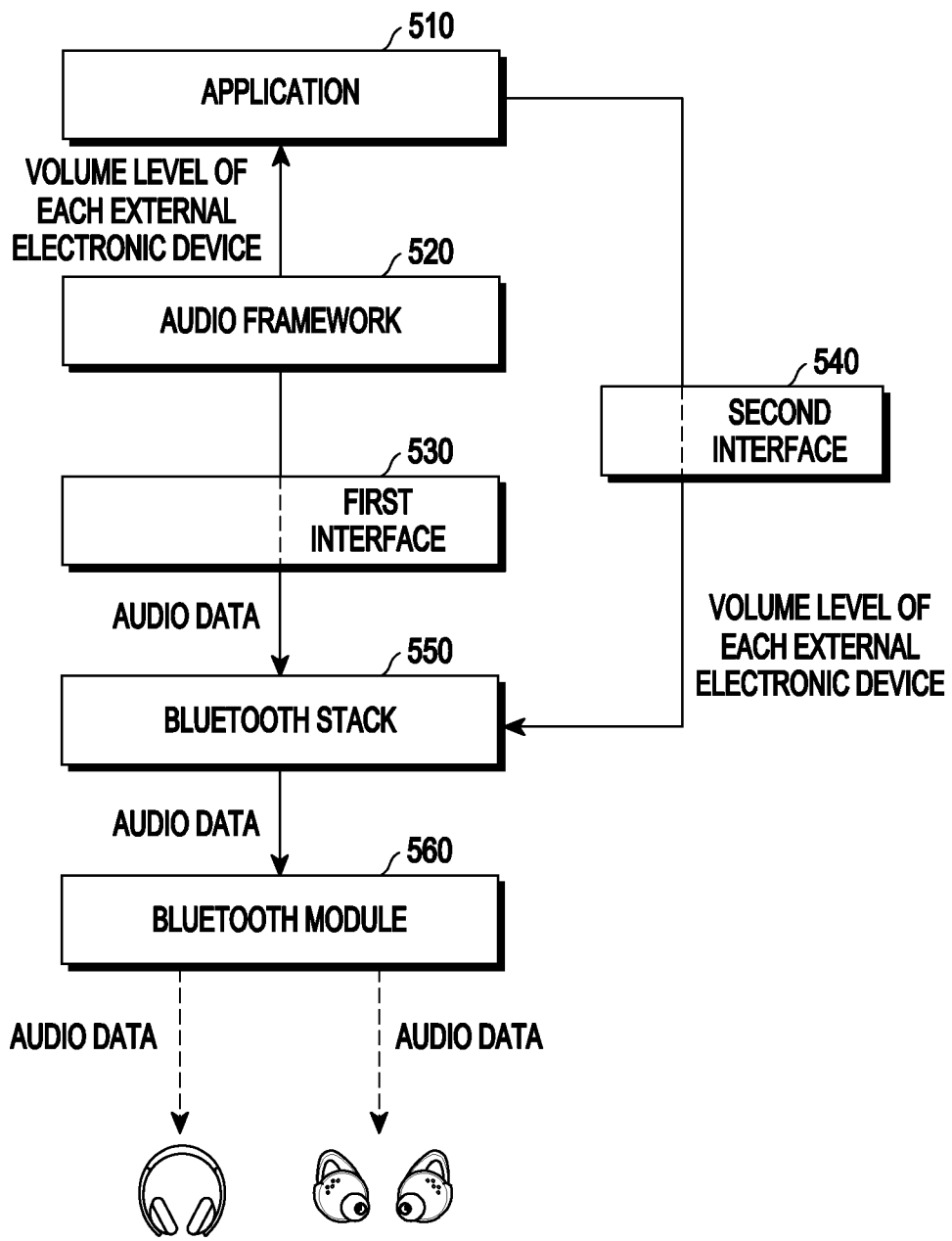
FIG. 5 is a diagram illustrating a software structure referred to for describing a data transmission path according to an embodiment of the disclosure.

FIG. 5 is a diagram illustrating a software structure referred to for describing a data transmission path according to an embodiment of the disclosure.

Referring to FIG. 5, the software structure according to various embodiments of the disclosure may include at least one of an application 510, an audio framework 520, a first interface 530, a second interface 540, a Bluetooth stack 550, or a Bluetooth module 560. The audio framework 520 according to various embodiments of the disclosure may transmit audio data to the Bluetooth stack 550 through the first interface 530. The first interface according to various embodiments of the disclosure may include a hardware abstraction layer (HAL). The audio framework 520 according to various embodiments of the disclosure may transmit data about the volume level of each external electronic device to the application 510. The application 510 according to various embodiments of the disclosure may include, for example, a volume user interface module and an A2DP service module. The application 510 (e.g., A2DP service module) according to various embodiments of the disclosure may transmit data about the volume level of each external electronic device to the Bluetooth stack 550 through the second interface 540. The second interface 540 according to various embodiments of the disclosure may include a java native interface (JNI). The Bluetooth stack 550 according to various embodiments of the disclosure may include, for example, a media task and an audio/video distribution transport protocol (AVDTP). The Bluetooth stack 550 (e.g., the media task) according to various embodiments of the disclosure may adjust the volume level of audio data received from the audio framework 520 such that the audio data may have a volume level corresponding to the volume level of an external electronic device that does not support media volume synchronization. The Bluetooth stack 550 (e.g., the media task) according to various embodiments of the disclosure may encode the audio data (e.g., audio data having the maximum volume level) received from the audio framework 520 and the audio data having the adjusted volume level by a Bluetooth codec, and then store the encoded audio data in a queue or a buffer. The Bluetooth stack 550 (e.g., AVDTP) according to various embodiments of the disclosure may transmit the audio data stored in the queue or buffer to the Bluetooth module 560 (e.g., a Bluetooth chip). The Bluetooth module 560 according to various embodiments of the disclosure may transmit the received audio data to the respective external electronic devices. The software structure according to various embodiments of the disclosure may further include a codec library. The codec library according to various embodiments of the disclosure may include at least one of a subband codec (SBC) encoder, an audio processing technology (APTX) encoder, or a scalable codec encoder. The Bluetooth stack 550 (e.g., the media task) according to various embodiments of the disclosure may encode the audio data by at least one of the SBC encoder, the APTX encoder, or the scalable codec encoder.

Figure 6A:
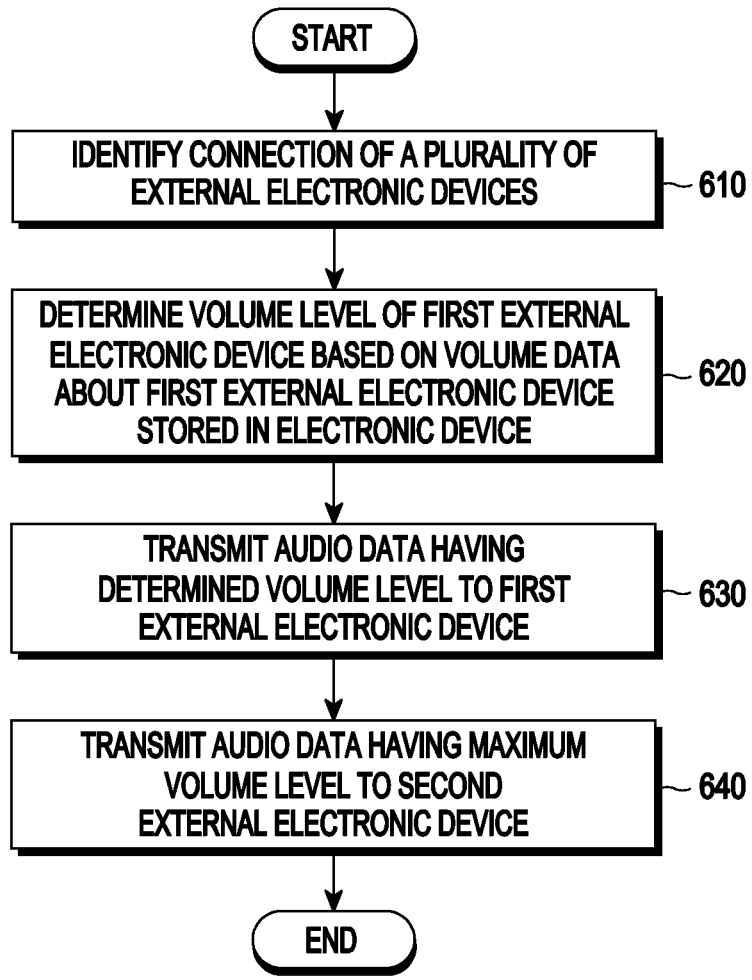
FIG. 6A is a diagram illustrating a method of operating an electronic device, when an external electronic device supporting an absolute volume feature and an external electronic device not supporting the absolute volume feature are connected to the electronic device according to an embodiment of the disclosure.
Figure 6B:
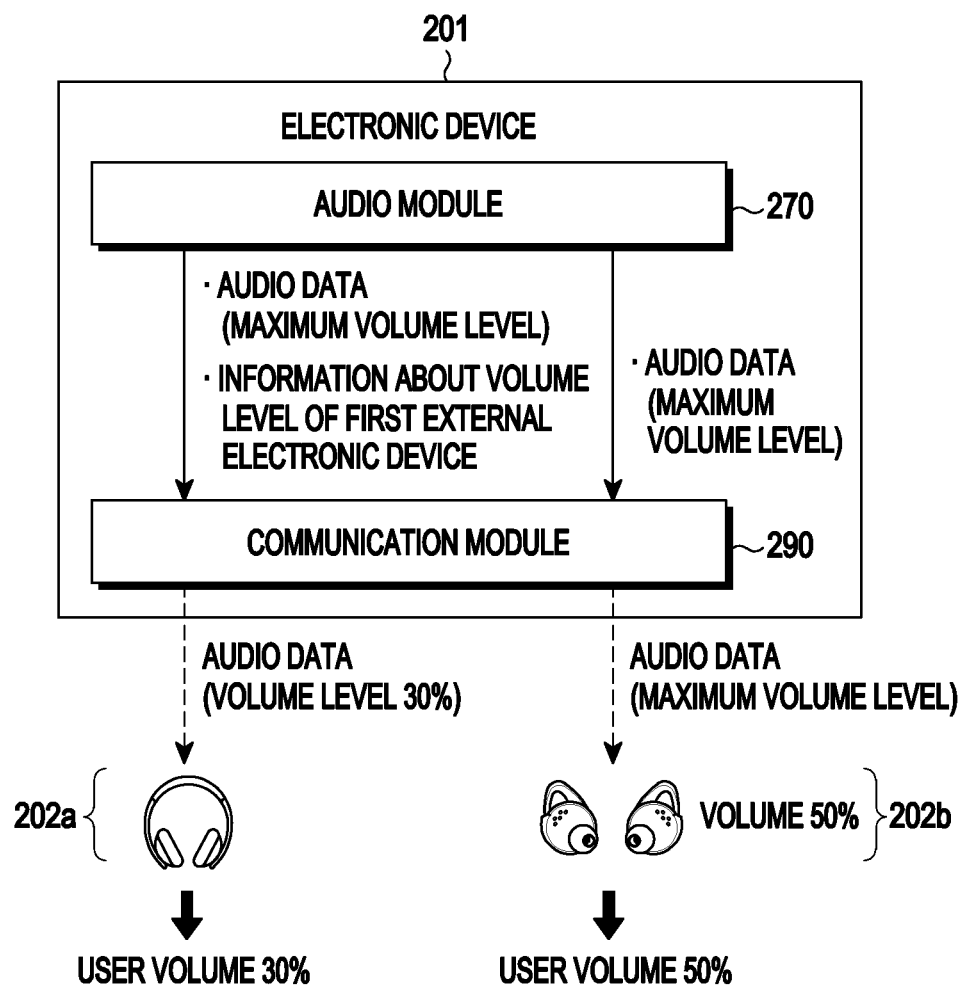
FIGS. 6B, 6C, and 6D are diagrams referred to for describing an attribute of audio data transmitted among an audio module, a communication module, and external electronic devices, when an external electronic device supporting the absolute volume feature and an external electronic device not supporting the absolute volume feature are connected to an electronic device according to various embodiments of the disclosure.
Figure 6C:
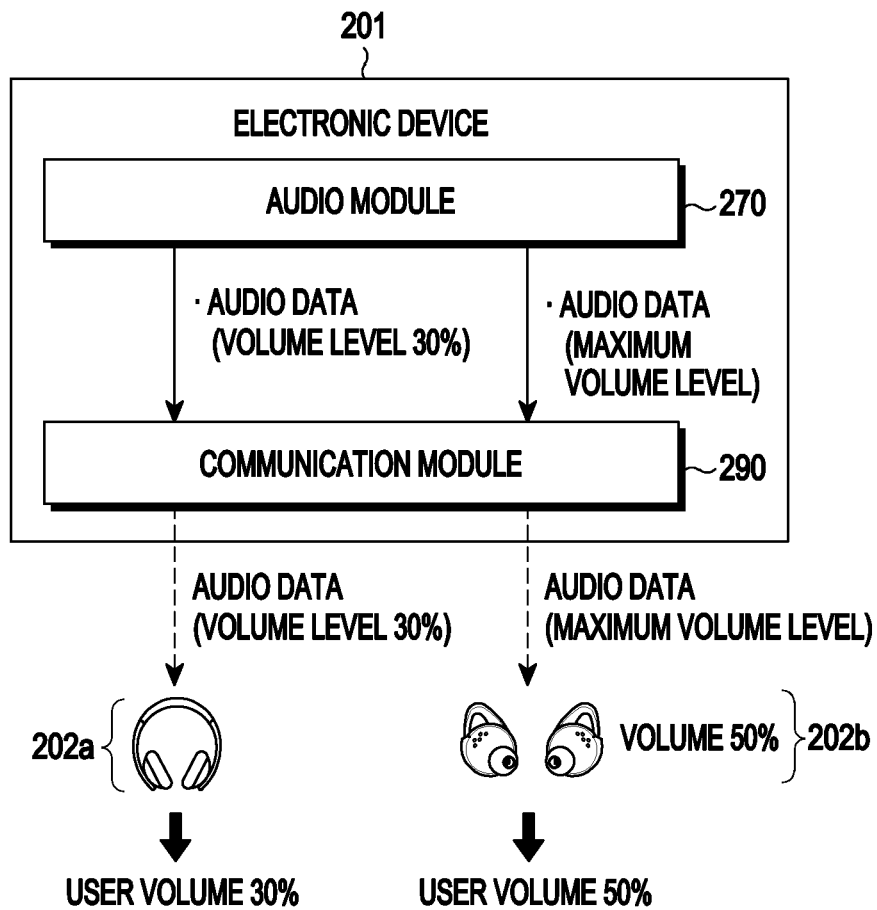
Figure 6D:
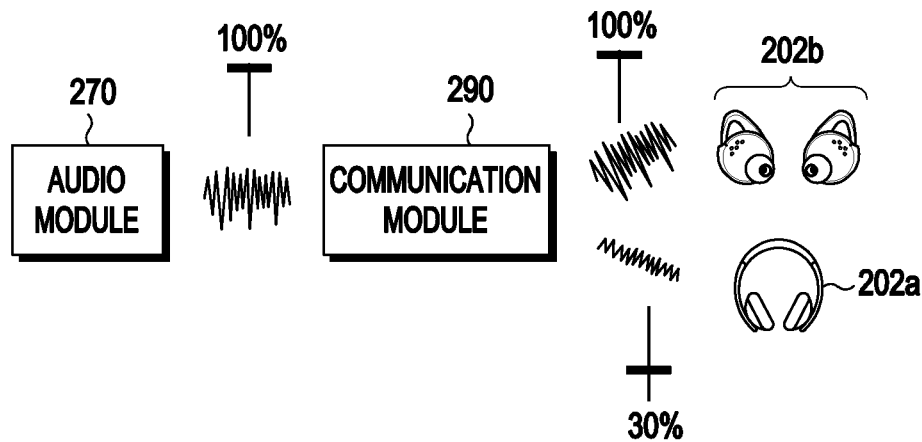

FIG. 6A is a diagram illustrating a method of operating an electronic device, when an external electronic device supporting the absolute volume feature and an external electronic device not supporting the absolute volume feature are connected to the electronic device according to an embodiment of the disclosure. FIGS. 6B to 6D are diagrams referred to for describing an attribute of audio data transmitted among the audio module 270, the communication module 290, and external electronic devices, when an external electronic device supporting the absolute volume feature and an external electronic device not supporting the absolute volume feature are connected to an electronic device according to various embodiments of the disclosure.

Referring to FIG. 6A, an electronic device (e.g., the electronic device 201 of FIG. 2) according to various embodiments of the disclosure may identify connection of a plurality of external electronic devices in operation 610. The plurality of external electronic devices (e.g., the external electronic device 202 of FIG. 2) according to various embodiments of the disclosure may be connected to the electronic device through short-range communication (e.g., Bluetooth communication). When a plurality of external electronic devices (e.g., the external electronic device 202 of FIG. 2) are connected to the electronic device (e.g., the electronic device 201 of FIG. 2) according to various embodiments of the disclosure, a guide message indicating that the plurality of external electronic devices (e.g., the external electronic device 202 of FIG. 2) have been connected to the electronic device (e.g., the electronic device 201 of FIG. 2) may be output, as illustrated in FIG. 4A. According to various embodiments of the disclosure, the dual audio mode may be activated according to user inputs, as illustrated in FIGS. 4B to 4D. Alternatively, when the presence of an external electronic device is detected in the vicinity of the electronic device (e.g., the electronic device 201 of FIG. 2), the electronic device (e.g., the electronic device 201 of FIG. 2) may activate the dual audio mode regardless of a user input.

In operation 620, the electronic device (e.g., the electronic device 201 of FIG. 2) according to various embodiments of the disclosure may determine the volume level of a first external electronic device (e.g., an electronic device that does not support the absolute volume feature) based on volume data for the first external electronic device stored in the electronic device (e.g., the electronic device 201 of FIG. 2). The electronic device (e.g., the electronic device 201 of FIG. 2) according to various embodiments of the disclosure may store data about the volume level of the first external electronic device in the electronic device (e.g., the audio module 270 or the memory 230 of FIG. 2). The communication module (e.g., the communication module 290 of FIG. 2) according to various embodiments of the disclosure may receive audio data having a first specified volume level (e.g., a maximum volume level) and data about a second specified volume level (e.g., the volume level of the first external electronic device) from the audio module (e.g., the audio module 270 of FIG. 2). The communication module (e.g., the communication module 290 of FIG. 2) according to various embodiments of the disclosure may use the data about the volume level of the first external electronic device to determine the volume level of the audio data having the first designated volume level (e.g., the maximum volume level) to correspond to the volume level of the first external electronic device. According to various embodiments of the disclosure, the audio data having the adjusted volume level may be at least temporarily stored in a buffer of the communication module (e.g., the communication module 290 of FIG. 2).

The electronic device (e.g., the electronic device 201 of FIG. 2) according to various embodiments of the disclosure may transmit the audio data having the determined volume level to the first external electronic device in operation 630. The communication module (e.g., the communication module 290 of FIG. 2) according to various embodiments of the disclosure may transmit the audio data at least temporarily stored in the buffer of the communication module (e.g., the communication module 290 of FIG. 2) to the first external electronic device.

In operation 640, the electronic device (e.g., the electronic device 201 of FIG. 2) according to various embodiments of the disclosure may transmit the audio data having the first specified volume level (e.g., the maximum volume level) to the second external electronic device. According to various embodiments of the disclosure, the function or operation of adjusting audio data to the first specified volume level (e.g., the maximum volume level) may be performed by the audio module (e.g., the audio module 270 of FIG. 2) or by the audio module (e.g., the audio module 270 of FIG. 2) under the control of the processor (e.g., the processor 220 of FIG. 2).

Referring to FIG. 6B, the audio module 270 according to various embodiments of the disclosure may set the volume level of audio data to be transmitted to a plurality of external electronic devices (e.g., a first external electronic device 202a and a second external electronic device 202b) to the first specified volume level (e.g., the maximum volume level). The audio module 270 according to various embodiments of the disclosure may transmit the audio data set to the first specified volume level (e.g., the maximum volume level) to the communication module 290. The audio module 270 according to various embodiments of the disclosure may transmit information about the volume level of the first external electronic device 202a to the communication module 290. While the audio data and the information about the volume level may be transmitted in different paths (e.g., channels) for the external electronic devices in FIG. 6B, this is merely exemplary. According to various embodiments of the disclosure, the audio data and the information about the volume level may be transmitted to the communication module 290 in one path (e.g., channel). The communication module 290 according to various embodiments of the disclosure may determine the volume level of audio data to be transmitted to each external electronic device by using the information about the volume level. The communication module 290 according to various embodiments of the disclosure may transmit audio data having a second specified volume level (e.g., 30%) determined by using the information about the volume level and the audio data having the first specified volume level (e.g., the maximum volume level) to the first external electronic device 202a and the second external electronic device 202b, respectively. According to various embodiments of the disclosure, the first external electronic device 202a that does not support the absolute volume feature may output audio content having the volume level (e.g., 30%) received from the electronic device 101. According to various embodiments of the disclosure, the second external electronic device 202b supporting the absolute volume feature may output audio content having a volume level (e.g., 50%) determined based on a combination of the first specified volume level (e.g., the maximum volume level) and a volume level set by the second external electronic device 102b.

Referring to FIG. 6C, the volume level of audio data to be transmitted to the first external electronic device 102a may be determined by the audio module 270 according to various embodiments of the disclosure. While FIG. 6B illustrates an embodiment in which the volume level of audio data to be transmitted to the first external electronic device 102a is determined by the communication module 290, FIG. 6C illustrates an embodiment in which the volume level of the audio data to be transmitted to the first external electronic device 102a is determined by the audio module 270.

The audio module 270 according to various embodiments of the disclosure may transmit audio data having a volume level (e.g., 30%) determined based on volume level information to the communication module 290. According to various embodiments of the disclosure, the processor (e.g., the processor 220 of FIG. 2) may control the audio module 270 or the communication module 290 to perform the function or operation of determining a volume level based on volume level information.

Referring to FIG. 6D, the audio module 270 according to various embodiments of the disclosure may transmit audio data having a first specified volume level (e.g., a maximum volume level) to the communication module 290. The communication module 290 according to various embodiments of the disclosure may transmit audio data having a volume level corresponding to the volume level (e.g., 30%) of the first external electronic device 102a to the first external electronic device 102a (e.g., an electronic device that does not support the absolute volume feature). The communication module 290 according to various embodiments of the disclosure may transmit audio data having the first designated volume level (e.g., the maximum volume level) to the second external electronic device 102b (e.g., an electronic device supporting an absolute volume feature). According to this operation, even when a plurality of external electronic devices are connected to the electronic device (e.g., when an electronic device supporting the absolute volume feature and an electronic device not supporting the absolute volume feature are connected to the electronic device), the volume of each external electronic device may control, which obviates the need for switching off the media volume synchronization function.

Figure 7A:
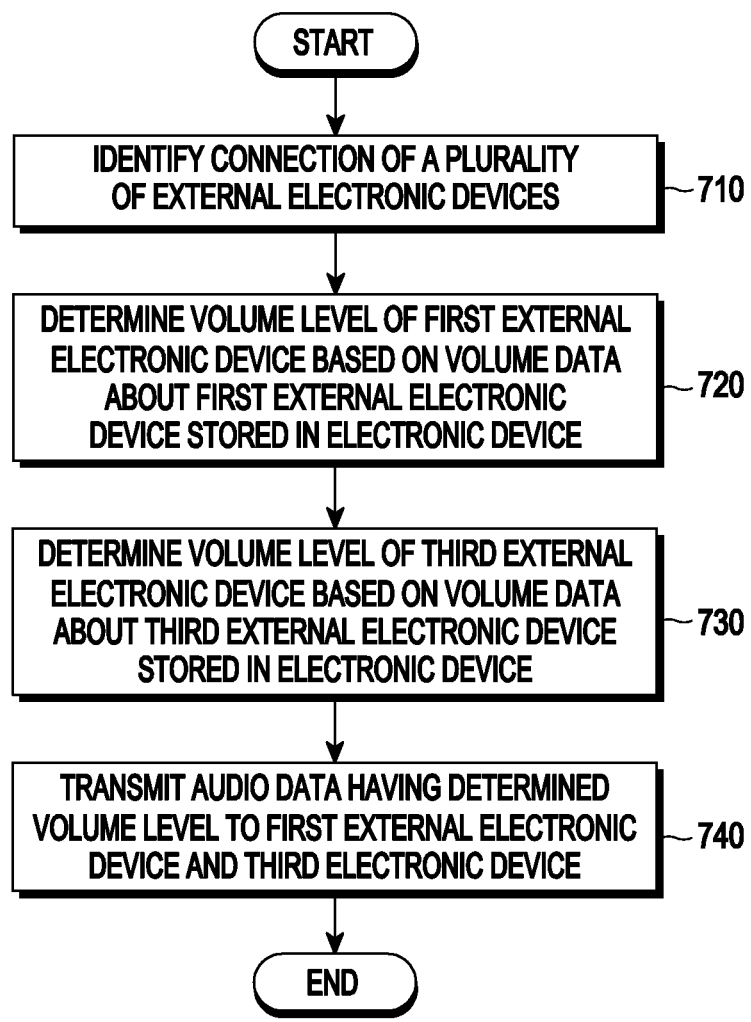
FIG. 7A is a diagram illustrating a method of operating an electronic device, when a plurality of external electronic devices that do not support the absolute volume feature are connected to the electronic device according to an embodiment of the disclosure.
Figure 7B:
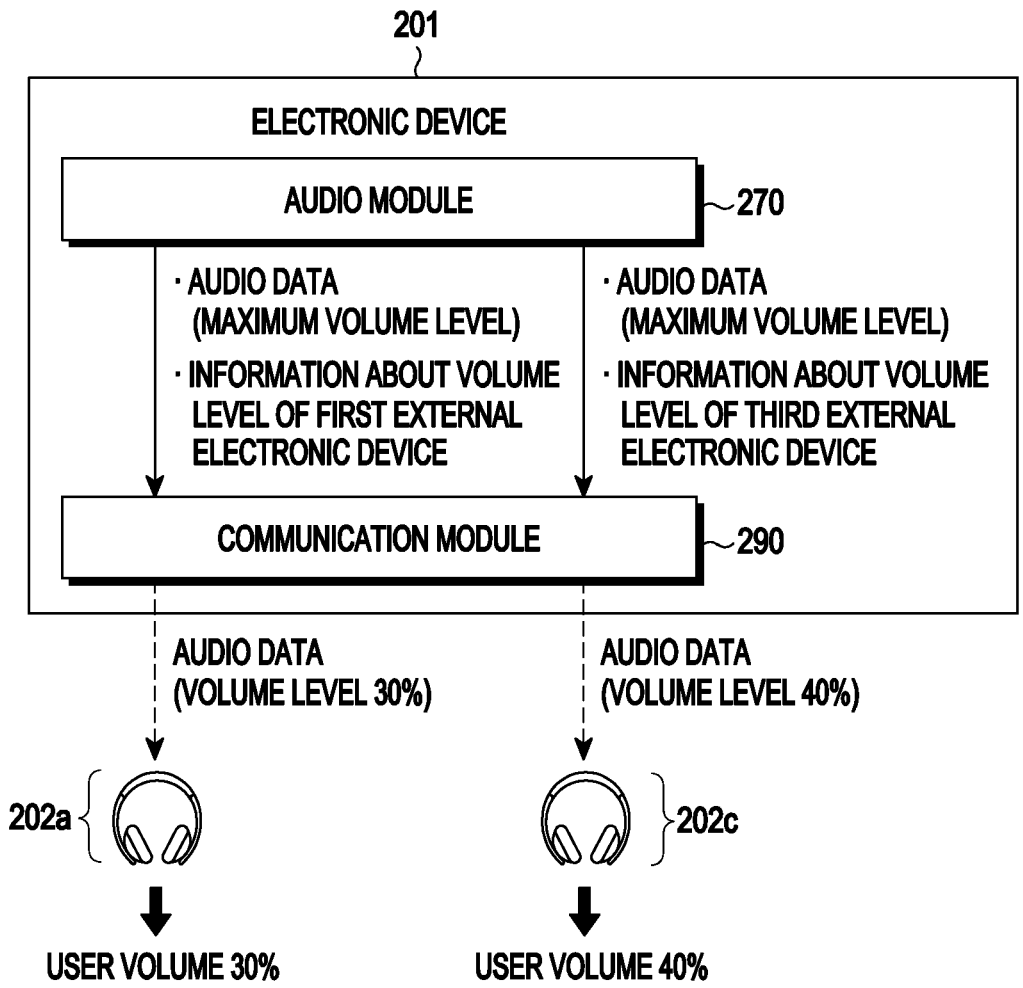
FIG. 7B is a diagram referred to for describing properties of audio data transmitted among an audio module, a communication module, and external electronic devices, when a plurality of external electronic devices not supporting the absolute volume feature are connected to an electronic device according to an embodiment of the disclosure.

FIG. 7A is a diagram illustrating a method of operating an electronic device, when a plurality of external electronic devices that do not support an absolute volume feature are connected to the electronic device according to an embodiment of the disclosure. FIG. 7B is a diagram an attribute of audio data transmitted among an audio module, a communication module, and external electronic devices, when a plurality of external electronic devices that do not support the absolute volume feature are connected to an electronic device according to an embodiment of the disclosure.

Referring to FIG. 7A, an electronic device (e.g., the electronic device 201 of FIG. 2) according to various embodiments of the disclosure may identify that a plurality of external electronic devices are connected in operation 710. The plurality of external electronic devices (e.g., the external electronic device 202 of FIG. 2) according to various embodiments of the disclosure may be connected to the electronic device through short-range communication (e.g., Bluetooth communication). When the plurality of external electronic devices (e.g., the external electronic device 202 of FIG. 2) are connected to the electronic device (e.g., the electronic device 201 of FIG. 2) according to various embodiments of the disclosure, a guide message indicating that the plurality of external electronic devices (e.g., the external electronic device 202 of FIG. 2) are connected to the electronic device (e.g., the electronic device 201 of FIG. 2 According to various embodiments of the disclosure, the dual audio mode may be activated according to user inputs as illustrated in FIGS. 4B to 4D. Alternatively, when the presence of an external electronic device is detected in the vicinity of the electronic device (e.g., the electronic device 201 of FIG. 2), the electronic device (e.g., the electronic device 201 of FIG. 2) may activate the dual audio mode regardless of a user input.

In operation 720, the electronic device (e.g., the electronic device 201 of FIG. 2) according to various embodiments of the disclosure may determine the volume level of a first external electronic device (e.g., an electronic device that does not support the absolute volume feature) based on volume data of the first external electronic device stored in the electronic device. In operation 730, the electronic device (e.g., the electronic device 201 of FIG. 2) according to various embodiments of the disclosure may determine the volume level of a third external electronic device (e.g., an electronic device that does not support the absolute volume feature) based on volume data of the third external electronic device stored in the electronic device. The description of operation 620 may be applied equally to operations 720 and 730 according to various embodiments of the disclosure. The first external electronic device and the third external electronic device according to various embodiments of the disclosure may be connected to the electronic device through short-range communication. The first external electronic device and the third external electronic device according to various embodiments of the disclosure may include electronic devices that do not support the absolute volume feature.

In operation 740, the electronic device (e.g., the electronic device 201 of FIG. 2) according to various embodiments of the disclosure may transmit audio data having the volume levels determined in operations 720 and 730 to the first external electronic device (e.g., the external electronic device 202 of FIG. 2) and the third external electronic device (e.g., the external electronic device 202 of FIG. 2).

Referring to FIG. 7B, the audio module 270 according to various embodiments of the disclosure may set the volume level of audio data to be transmitted to a plurality of external electronic devices (e.g., the first external electronic device 202a and a third external electronic device 202c) to the first specified volume level (e.g., the maximum volume level). The audio module 270 according to various embodiments of the disclosure may transmit audio data set to the first specified volume level (e.g., the maximum volume level) to the communication module 290. The audio module 270 according to various embodiments of the disclosure may transmit information about the volume levels of the first external electronic device 202a and the third external electronic device 202c to the communication module 290. While the audio data and the information about the volume levels may be transmitted in different paths (e.g., channels) to the respective external electronic devices in FIG. 7B, this is merely exemplary. According to various embodiments of the disclosure, the audio data and the information about the volume levels may be transmitted to the communication module 290 through one path (e.g., channel). The communication module 290 according to various embodiments of the disclosure may determine the volume level of audio data to be transmitted to each external electronic device by using the information about the volume levels. The communication module 290 according to various embodiments of the disclosure may transmit audio data having the volume levels (e.g., 30% and 40%) determined based on the information about the volume levels to the first external electronic device 202a and the third external electronic device 202c, respectively. According to various embodiments of the disclosure, the first external electronic device 202a and the third external electronic device 202c that do not support the absolute volume feature may output audio content having the volume levels (e.g., 30% and 40%) transmitted from the electronic device 101. According to various embodiments of the disclosure, the volume levels of audio data transmitted to the first external electronic device 202a and the third external electronic device 202c may be determined by the audio module.

Figure 8A:
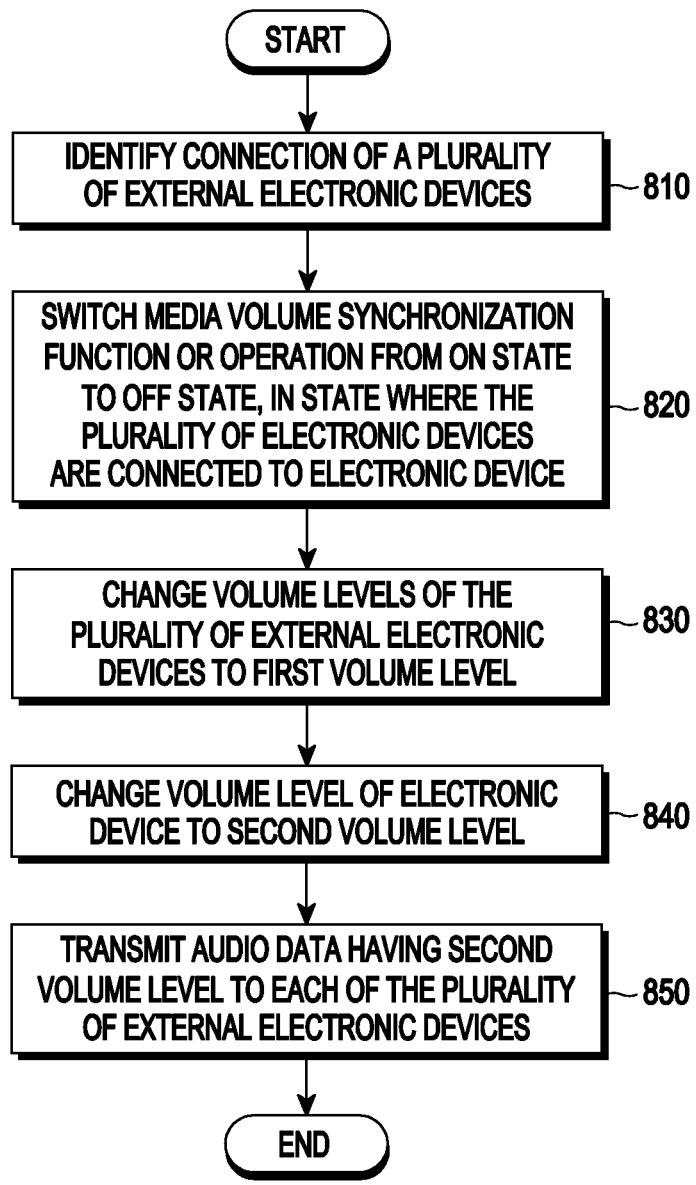
FIGS. 8A, 8B, and 8C are diagrams illustrating another method of operating an electronic device, when a plurality of external electronic devices supporting the absolute volume feature are connected to the electronic device according to various embodiments of the disclosure.
Figure 8B:
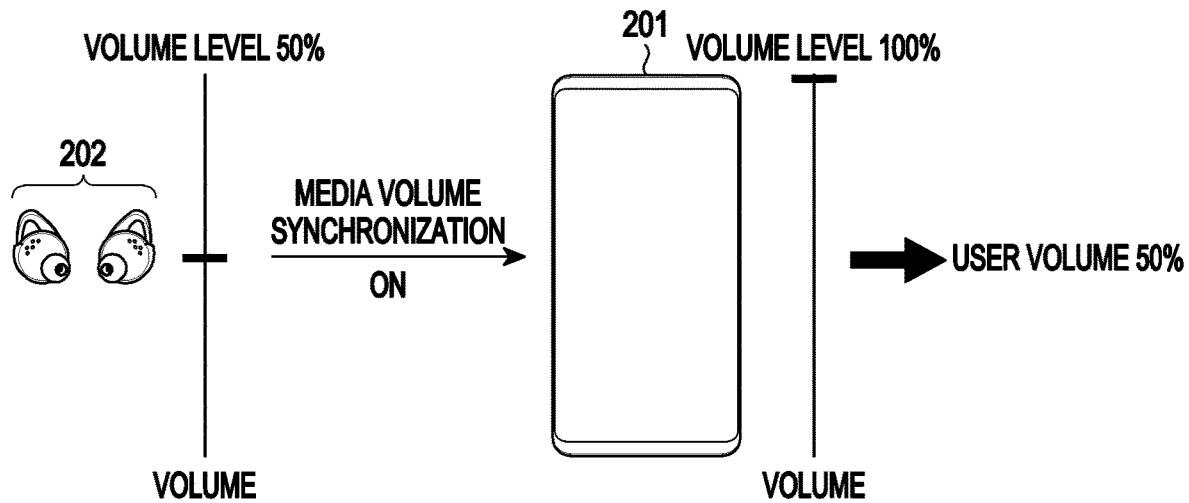
Figure 8C:
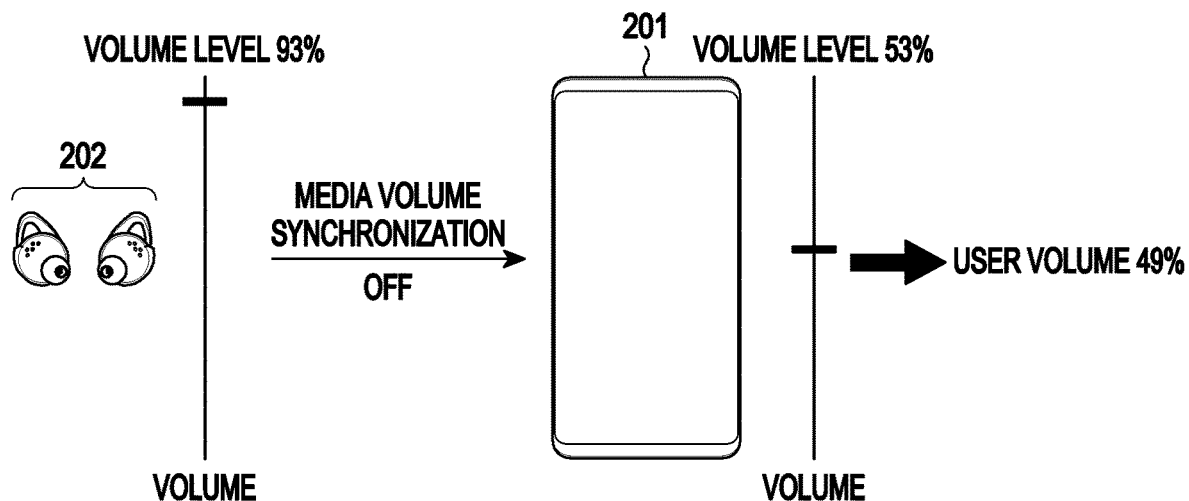

FIGS. 8A to 8C are diagrams illustrating another method of operating an electronic device, when a plurality of external electronic devices supporting the absolute volume feature are connected to the electronic device according to various embodiments of the disclosure.

Referring to FIG. 8A, in operation 810, an electronic device (e.g., the electronic device 201 of FIG. 2) according to various embodiments of the disclosure may identify that a plurality of external electronic devices (e.g., electronic devices supporting the absolute volume feature) have been connected. The description of operation 310 may be equally applied to operation 810.

In operation 820, with the plurality of external electronic devices connected to the electronic device, the electronic device (e.g., the electronic device 201 of FIG. 2) according to various embodiments of the disclosure may switch the media volume synchronization function or operation from the ON state to the OFF state. The electronic device according to various embodiments of the disclosure may switch the media volume synchronization function to the OFF state, when identifying that a plurality of external electronic devices (e.g., electronic devices supporting the absolute volume feature) have been connected, or according to a user input.

In operation 830, the electronic device (e.g., the electronic device 201 of FIG. 2) according to various embodiments of the disclosure may change the volume levels of the plurality of external electronic devices to a first volume level (e.g., 93%). According to various embodiments of the disclosure, the electronic device (e.g., the electronic device 201 of FIG. 2) may adjust the volumes of the external electronic devices supporting the absolute volume feature. For example, the electronic device (e.g., the electronic device 201 of FIG. 2) according to various embodiments of the disclosure may transmit a volume control command to the plurality of external electronic devices. The electronic device (e.g., the electronic device 201 of FIG. 2) according to various embodiments of the disclosure may receive volume information about each of the plurality of external electronic devices from the external electronic device in response to the transmission of the volume control command.

In operation 840, the electronic device (e.g., the electronic device 201 of FIG. 2) according to various embodiments of the disclosure may change the volume level of the electronic device (e.g., the electronic device 201 of FIG. 2) to a second volume level (e.g., 53%).

The electronic device (e.g., the electronic device 201 of FIG. 2) according to various embodiments of the disclosure may transmit audio data having the second volume level to each of the plurality of external electronic devices in operation 850.

Referring to FIG. 8B, when the media volume synchronization function is in the ON state, the volume of audio data output from the electronic device 201 may be fixed to the maximum level. Accordingly, audio content output from the external electronic device 102 may be output at a volume level of 50% set by the user.

Referring to FIG. 8C, when the media volume synchronization function is turned off (e.g., when a plurality of external electronic devices are connected to the electronic device), the volume level of the electronic device 201 may be set to be lower (e.g., 53%) than the maximum volume level, and the volume level of the external electronic device 202 may be set to be (e.g., 93%) different from the current set volume level. In this case, audio content output from the external electronic device 202 may be output at a volume level of 49%, similar to that when the media volume synchronization function or operation is in the ON state.

Figure 9A:
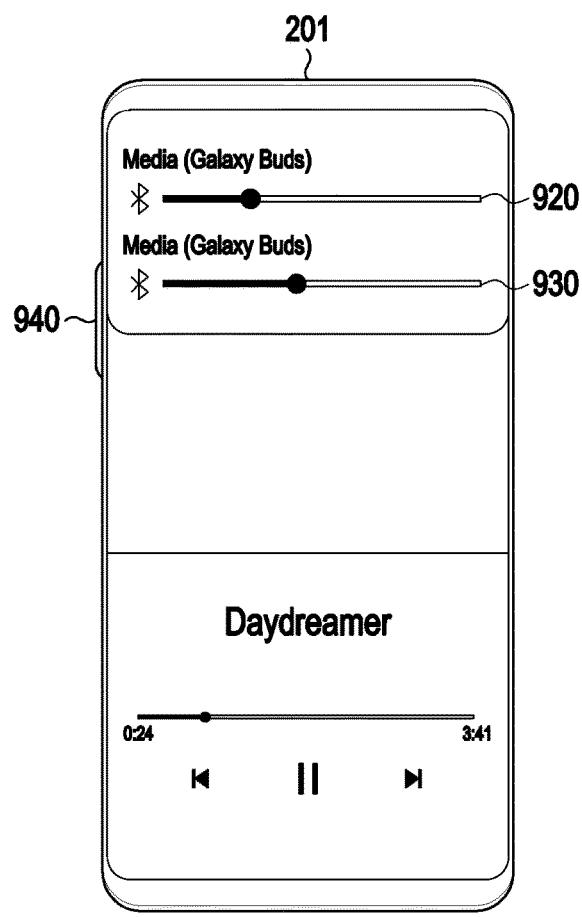
FIGS. 9A, 9B, and 9C are diagrams illustrating user interfaces for controlling the volume of each of a plurality of external electronic devices (e.g., external electronic devices supporting the absolute volume feature), when the plurality of external electronic devices are connected to an electronic device according to various embodiments of the disclosure.
Figure 9B:
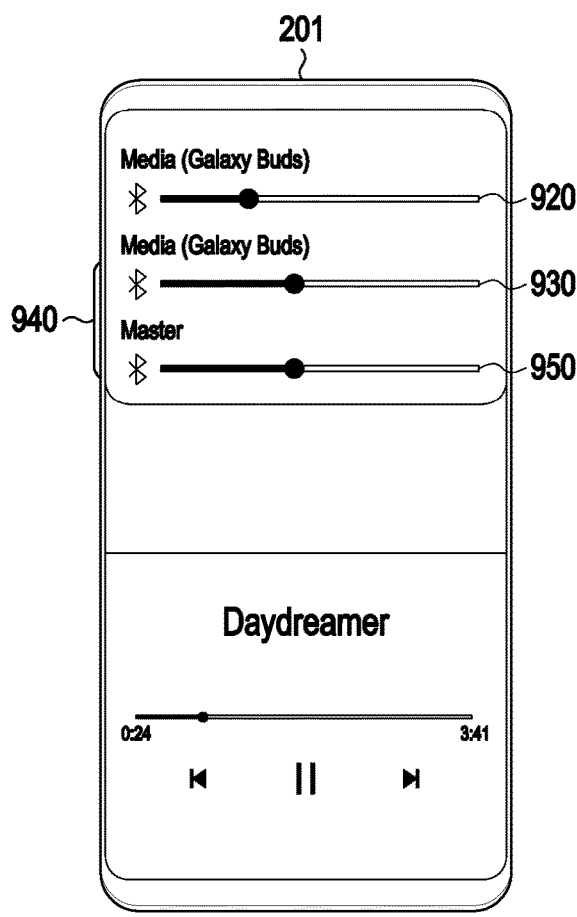
Figure 9C:
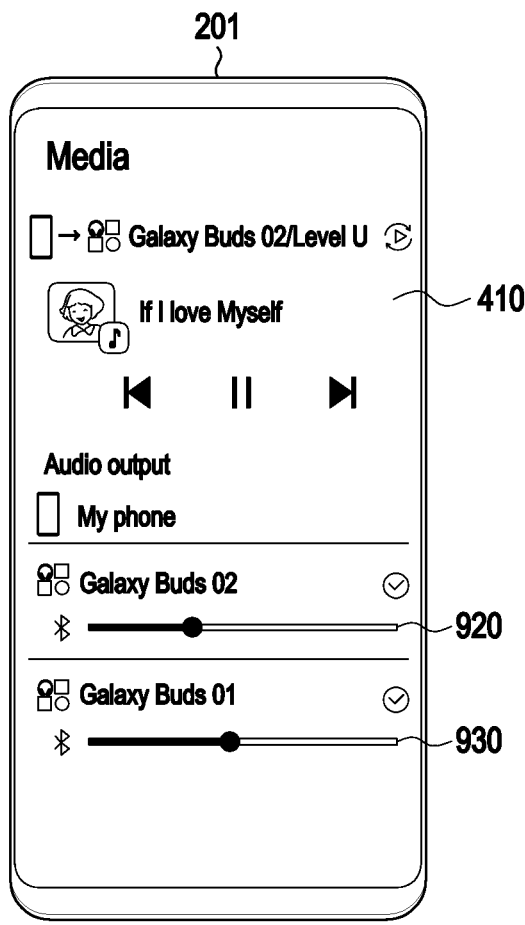

FIGS. 9A, 9B, and 9C are diagrams illustrating user interfaces for controlling the volume of each of a plurality of external electronic devices (e.g., external electronic devices supporting the absolute volume feature), when the plurality of external electronic devices are connected to an electronic device according to various embodiments of the disclosure.

Referring to FIG. 9A, the electronic device 201 according to various embodiments of the disclosure may display a plurality of user interfaces 920 and 930 indicating current volume information about a plurality of external electronic devices connected to the electronic device 201. The electronic device 201 according to various embodiments of the disclosure may control the volumes of the plurality of external electronic devices according to a volume control command of the user on at least one of the plurality of user interfaces (e.g., a first user interface 920 and a second user interface 930). The electronic device 201 according to various embodiments of the disclosure may receive a selection input for a target electronic device for which volume control is to be performed. Upon receipt of a user input to a physical button 940 in a state where one specific device is selected according to the user selection input, the electronic device 201 according to various embodiments of the disclosure may control the volume of the specific one device. When the volume of the specific device reaches a maximum value or a minimum value according to the user selection input to the physical button 940, the electronic device 201 according to various embodiments of the disclosure may continuously/successively control the volume of another specific device according to a user input to the physical button 940.

Referring to FIG. 9B, the electronic device 201 according to various embodiments of the disclosure may display a user interface 950 for simultaneously controlling the volumes of a plurality of external electronic devices. The electronic device 201 may simultaneously control the volumes of the plurality of external electronic devices connected to the electronic device 201 according to a user input to the user interface 950 for simultaneously controlling the volumes of a plurality of external electronic devices according to various embodiments of the disclosure. Upon receipt of the user input to the user interface 950 for simultaneously controlling the volumes of a plurality of external electronic devices, the electronic device 201 according to various embodiments of the disclosure may transmit a volume control command to each of the plurality of external electronic devices. The electronic device 201 according to various embodiments of the disclosure may receive current volume information from the plurality of external electronic devices in response to the transmission of the volume control command. The electronic device 201 according to various embodiments of the disclosure may display the current volume of each of the plurality of external electronic devices based on the current volume information received from the plurality of external electronic devices on the plurality of user interfaces (e.g., the first user interface 920 and the second user interface 930). When controlling the volume of one external electronic device according to a user input to the first user interface 920, the electronic device 201 according to various embodiments of the disclosure may maintain the volume of the other external electronic device or change the volume of the other external electronic device to correspond (e.g., proportionally) to a change in the volume of the one external electronic device. When the volume of any one external electronic device is set to the maximum, the electronic device 201 according to various embodiments of the disclosure may also continuously/successively control the volume of the user interface 950 for simultaneously controlling the volumes of a plurality of external electronic devices. When the volume of any one external electronic device is controlled to increase, the electronic device 201 according to various embodiments of the disclosure may control the volume of the other external electronic device to reach the maximum volume level at the same time when the volume level of the one external electronic device becomes the maximum volume level. On the contrary, when the volume of any one external electronic device is controlled to decrease, the electronic device 201 according to various embodiments of the disclosure may control the volume of the other external electronic device to reach the minimum volume level at the same time when the volume level of the one external electronic device becomes the minimum volume level.

Referring to FIG. 9C, the electronic device according to various embodiments of the disclosure may display the plurality of user interfaces (e.g., the first user interface 920 and the second user interface 930) through the quick panel 410. When the external electronic devices support the absolute volume feature, the electronic device 201 according to various embodiments of the disclosure may display the current volumes of the plurality of external electronic devices on the plurality of user interfaces (e.g., the first user interface 920 and the second user interface 930).

Figure 10:
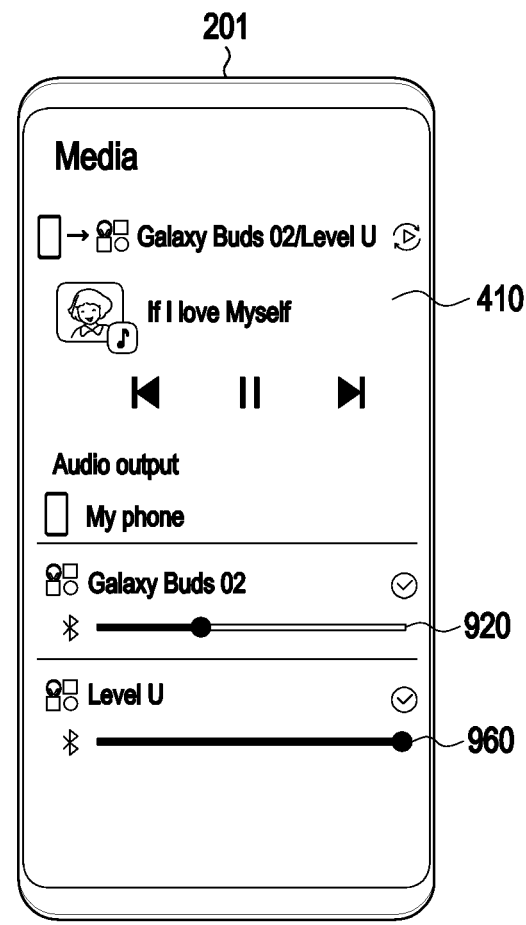
FIG. 10 is a diagram illustrating a user interface for controlling the volume of each of a plurality of external electronic devices (e.g., an external electronic device supporting the absolute volume feature and an external electronic device not supporting the absolute volume feature), when the plurality of external electronic devices are connected to an electronic device according to an embodiment of the disclosure.

FIG. 10 is a diagram illustrating a user interface for controlling the volume of each of a plurality of external electronic devices (e.g., an external electronic device supporting the absolute volume feature and an external electronic device not supporting an absolute volume feature), when the plurality of external electronic devices are connected to an electronic device according to an embodiment of the disclosure.

Referring to FIG. 10, the electronic device 201 according to various embodiments of the disclosure may display the first user interface 920 for controlling the volume of an external electronic device supporting the absolute volume feature and a third user interface 960 for controlling the volume of an external electronic device not supporting the absolute volume feature. The electronic device 201 according to various embodiments of the disclosure may display the current volume of the external electronic device supporting the absolute volume feature on the first user interface 920. The electronic device 201 according to various embodiments of the disclosure may control the volume of the external electronic device supporting the absolute volume feature according to a user volume control command (e.g., a touch and drag gesture) on the first user interface 920. The electronic device 201 according to various embodiments of the disclosure may display the current volume of the external electronic device that does not support the absolute volume feature on the third user interface 960. The electronic device 201 according to various embodiments of the disclosure may display the current volume of the external electronic device on the third user interface 960 based on a volume table stored in the electronic device 201. Alternatively, the electronic device 201 according to various embodiments of the disclosure may display the current volume level of the electronic device 201 (e.g., at a time when a specific application is being executed) as the volume level of the external electronic device on the third user interface 960. The electronic device 201 according to various embodiments of the disclosure may control the volume of the external electronic device that does not support the absolute volume feature according to a user volume control command (e.g., a touch and drag gesture) on the third user interface 960.

FIGS. 11A to 11D are diagrams illustrating a function or operation of controlling the volume of an external electronic device according to various embodiments of the disclosure.

Figure 11A:
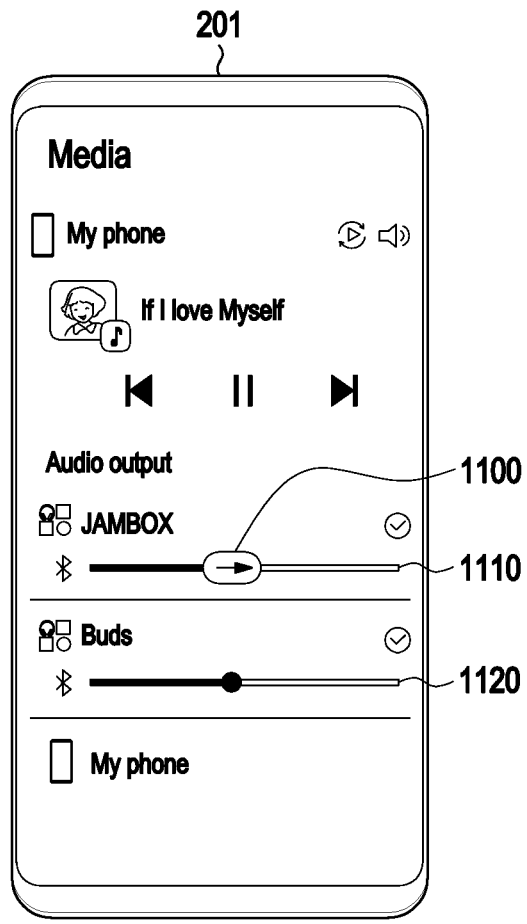
FIGS. 11A, 11B, 11C, and 11D are diagrams illustrating a function or operation of controlling the volume of an external electronic device according to various embodiments of the disclosure.
Figure 11B:
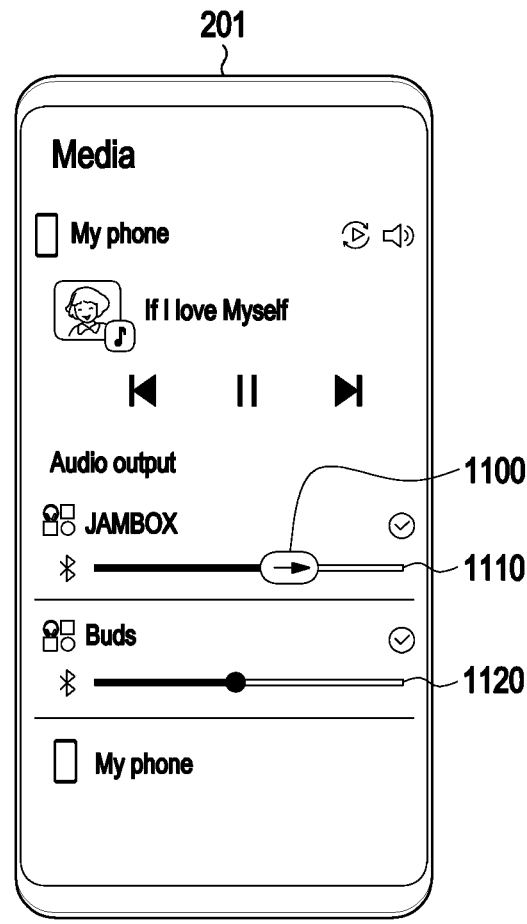

Referring to FIGS. 11A and 11B, the electronic device 201 according to various embodiments of the disclosure may receive a first user input 1100 for controlling the volume of an external electronic device through at least one of a fourth user interface 1110 or a fifth user interface 1120. Upon receipt of the first user input 1100, the electronic device 201 according to various embodiments of the disclosure may control the volume of at least one external electronic device (e.g., a device that does not support the absolute volume feature).

Figure 11C:
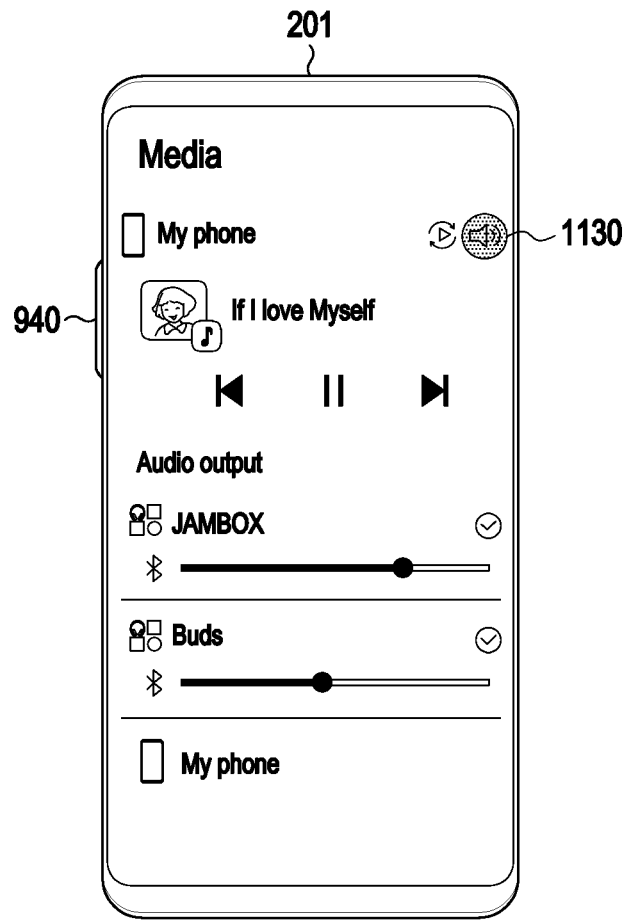

Referring to FIG. 11C, the electronic device 201 according to various embodiments of the disclosure may receive a second user input 1130 to a physical button 940 or an interface for displaying a menu for controlling the volume of an external electronic device.

Figure 11D:
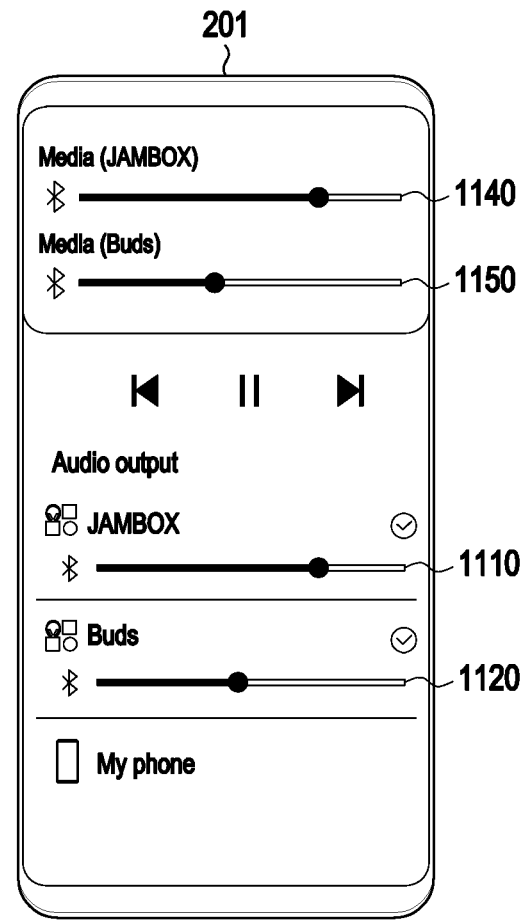

Referring to FIG. 11D, the electronic device 201 according to various embodiments of the disclosure may display a sixth user interface 1140 and a seventh user interface 1150 for controlling the volume of an external electronic device. The fourth user interface 1110 and the sixth user interface 1140 according to various embodiments of the disclosure may indicate the same volume level. The fifth user interface 1120 and the seventh user interface 1150 according to various embodiments of the disclosure may indicate the same volume level.

Figure 12A:
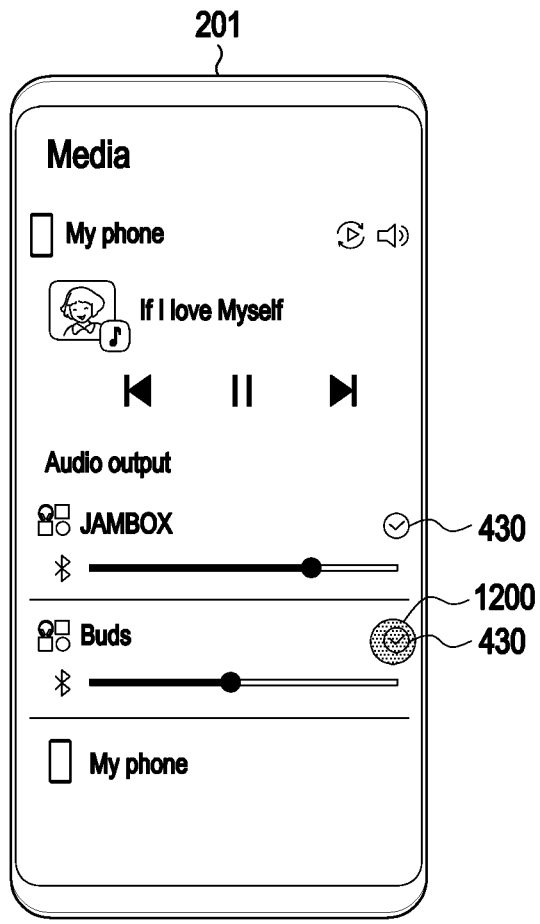
FIGS. 12A, 12B, and 12C are diagrams illustrating a function or operation of deactivating the dual audio function or operation according to various embodiments of the disclosure.
Figure 12B:
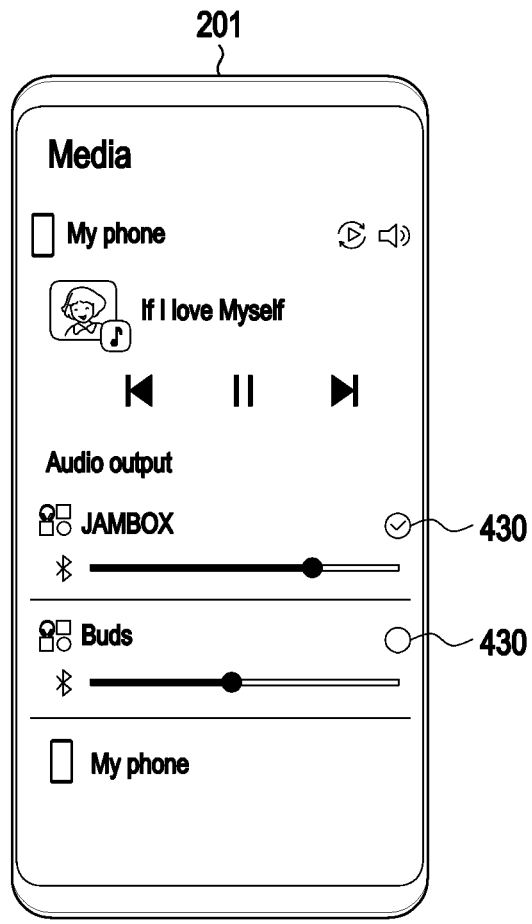
Figure 12C:
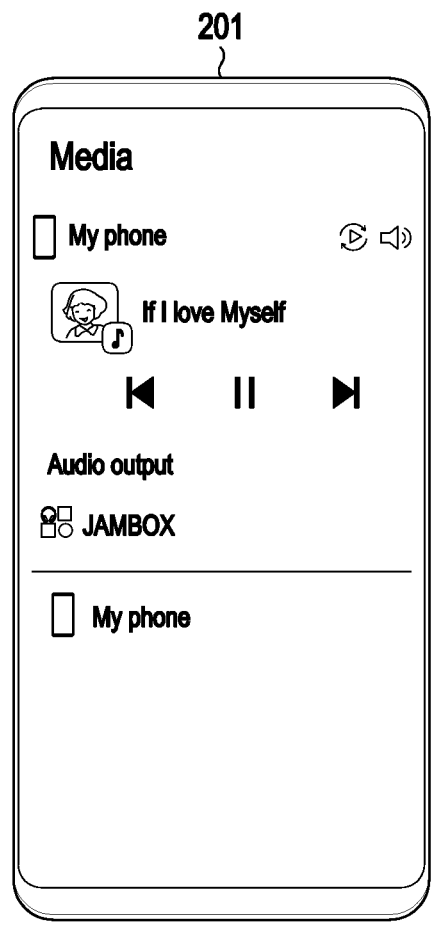

FIGS. 12A to 12C are diagrams illustrating a function or operation for deactivating the dual audio function or operation according to various embodiments of the disclosure.

Referring to FIG. 12A, the electronic device 201 according to various embodiments of the disclosure may receive a third user input 1200 to at least one of the user interfaces 430 for activating the dual audio function or operation, while the dual audio mode is activated.

Referring to FIG. 12B, according to various embodiments of the disclosure, upon reception of the third user input 1200 to the at least one interface, the electronic device 201 may not display a check mark and disconnect from an external electronic device (e.g., "Buds").

Referring to FIG. 12C, the electronic device 201 according to various embodiments of the disclosure may display only information about at least one external electronic device (e.g., "JAMBOX") currently connected to the electronic device 201.

Figure 13A:
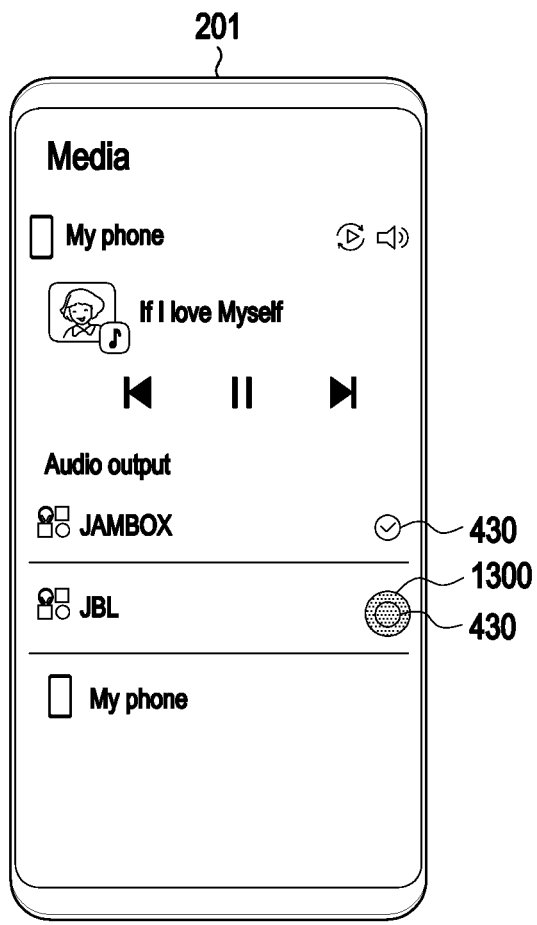
FIGS. 13A, 13B, and 13C are diagrams illustrating a function or operation of displaying a user interface for controlling the volume of an external electronic device, and a function or operation of performing a mirroring function or operation with another external electronic device, while the dual audio function or operation is activated according to various embodiments of the disclosure.
Figure 13B:
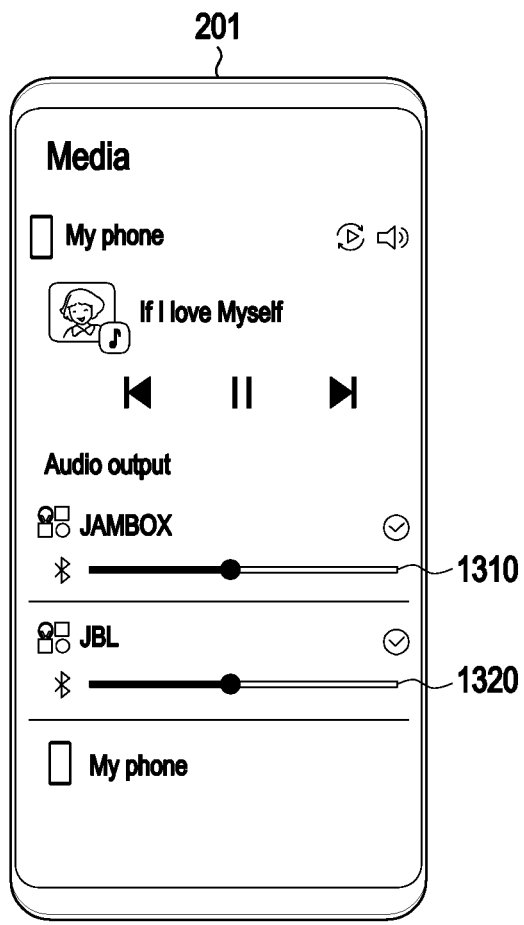
Figure 13C:

FIGS. 13A to 13C are diagrams illustrating a function or operation of displaying a user interface for controlling the volume of an external electronic device, and a function or operation of performing a mirroring function or operation with another external electronic device, while the dual audio function or operation is activated according to various embodiments of the disclosure.

Referring to FIG. 13A, the electronic device 201 according to various embodiments of the disclosure may receive a fourth user input 1300 to any one of the user interfaces 430 for activating the dual audio function or operation.

Referring to FIG. 13B, the electronic device 201 according to various embodiments of the disclosure may display interfaces (e.g., an eighth user interface 1310 and a ninth user interface 1320) for controlling the volumes of a plurality of external electronic devices.

Referring to FIG. 13C, when an external electronic device and the electronic device 201 are connected for mirroring while the dual audio function is active, the electronic device 201 according to various embodiments of the disclosure may display information (e.g., TV Samsung) 1330 about the external electronic device connected for mirroring.

Figure 14A:
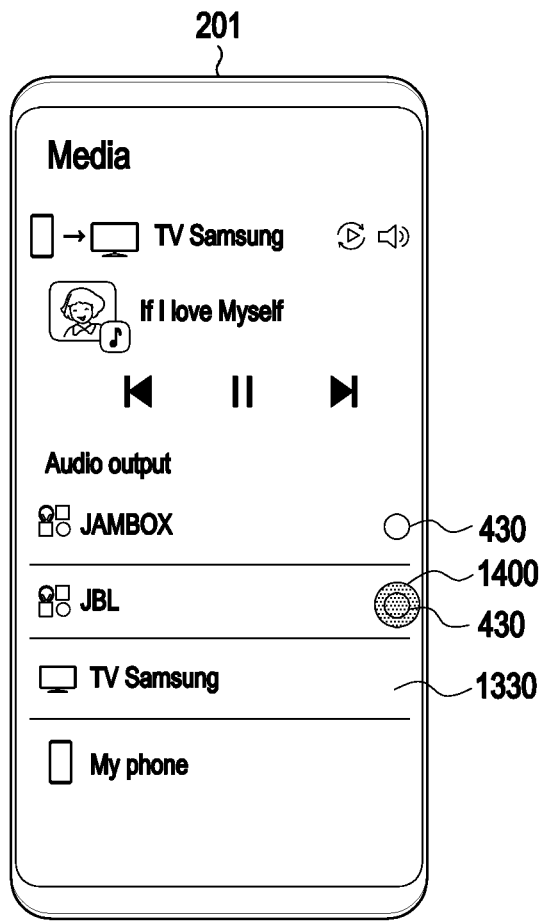
FIGS. 14A, 14B, and 14C are diagrams illustrating a function or operation of activating the dual audio function or operation, while an electronic device and an external electronic device are connected for mirroring according to various embodiments of the disclosure.
Figure 14B:
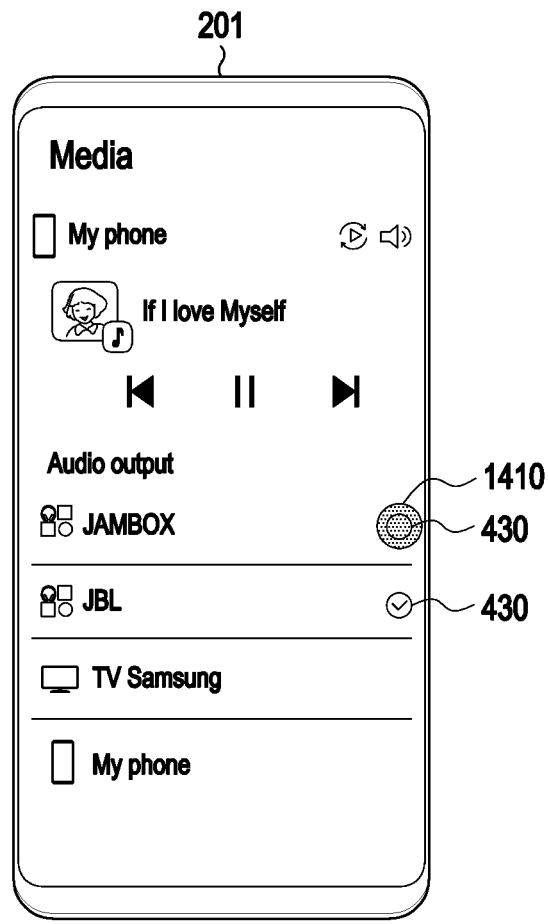
Figure 14C:
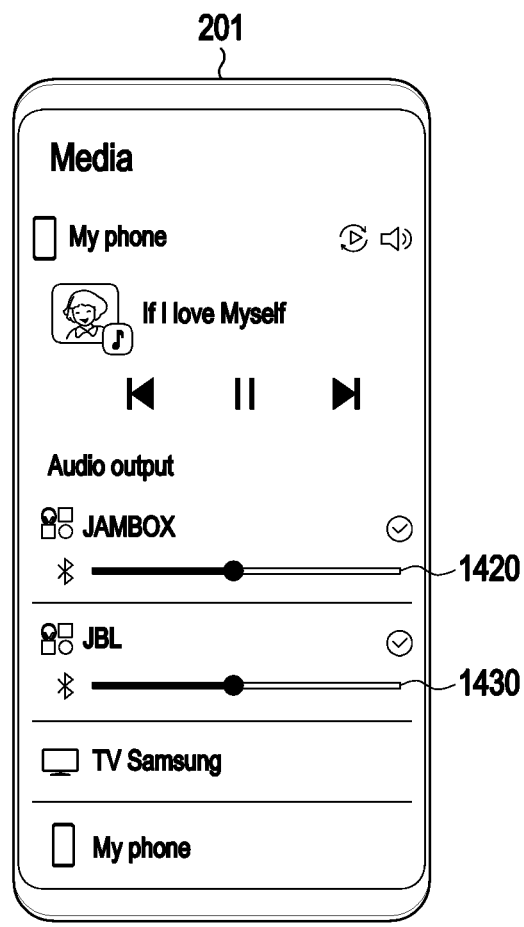

FIGS. 14A to 14C are diagrams illustrating a function or operation for activating the dual audio mode function or operation, while an electronic device and an external electronic device are connected for mirroring according to various embodiments of the disclosure.

Referring to FIG. 14A, when an external electronic device and the electronic device 201 are connected for mirroring while the dual audio function is active, the electronic device 201 according to various embodiments of the disclosure may display the information (e.g., TV Samsung) 1330 about the electronic device, for example, on a quick panel. The electronic device 201 according to various embodiments of the disclosure may display information about a plurality of external electronic devices connected to the electronic device 201 through short-range communication. The electronic device 201 according to various embodiments of the disclosure may display the user interfaces 430 for activating the dual audio function or operation. The electronic device 201 according to various embodiments of the disclosure may receive a fifth user input 1400 to any one of the user interfaces 430 for activating the dual audio function or operation.

Referring to FIG. 14B, the electronic device 201 according to various embodiments of the disclosure may receive a sixth user input to the other user interface 430 for activating the dual audio function or operation. The electronic device 201 according to various embodiments of the disclosure may activate the dual audio function or operation according to the reception of the fifth user input 1400 and the sixth user input 1410.

Referring to FIG. 14C, the electronic device 201 according to various embodiments of the disclosure may display a tenth user interface 1420 and an eleventh user interface 1430 for controlling the volumes of the plurality of external electronic devices connected to the electronic device 201.

Figure 15A:
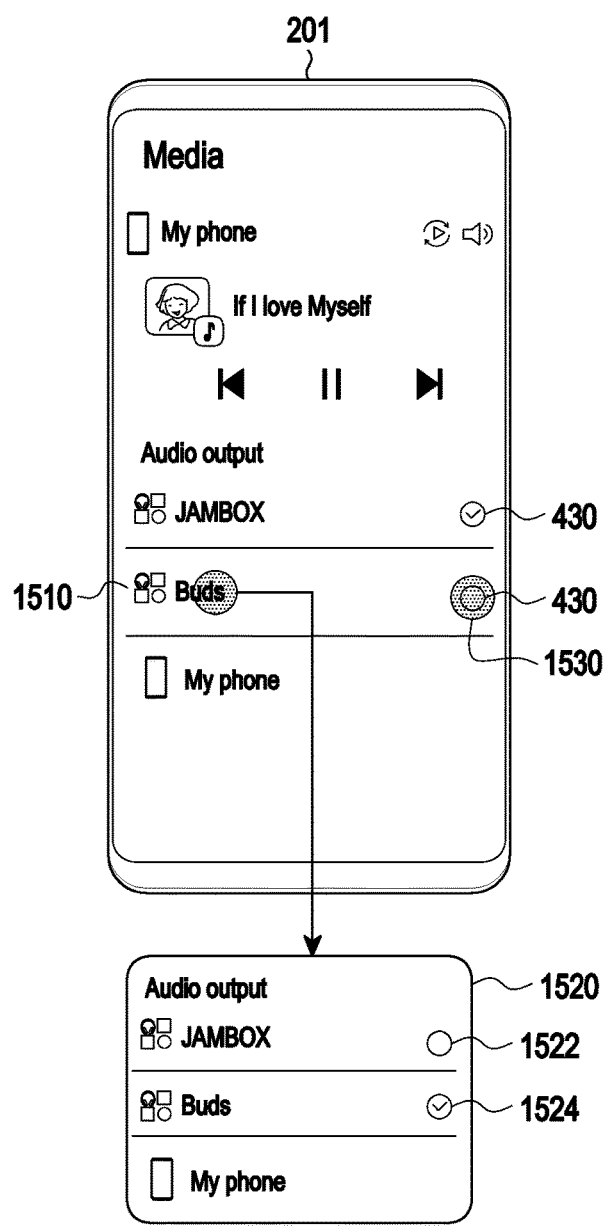
FIG. 15A is a diagram illustrating another embodiment for activating the dual audio function or operation according to an embodiment of the disclosure.
Figure 15B:
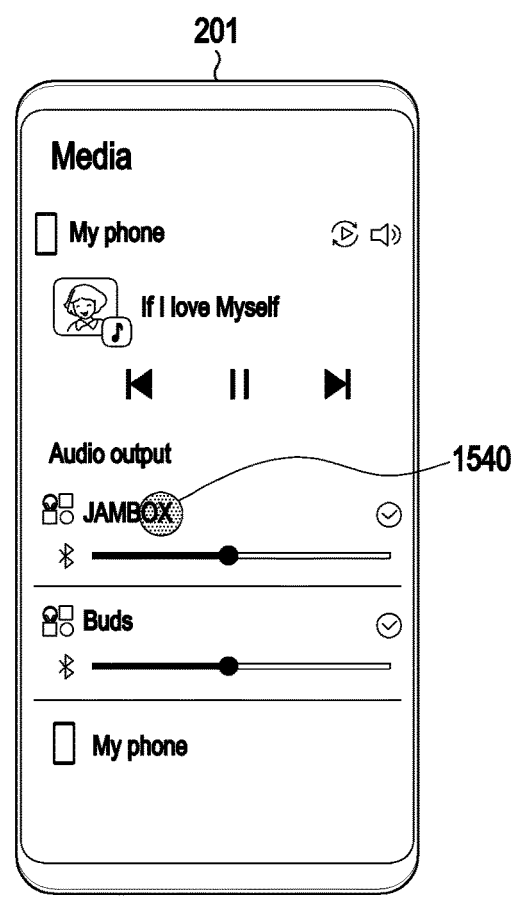
FIG. 15B is a diagram illustrating a function or operation of displaying no volume control interface according to an embodiment of the disclosure.

FIG. 15A is a diagram illustrating another embodiment of activating the dual audio function or operation according to an embodiment of the disclosure. FIG. 15B is a diagram illustrating a function or operation of displaying no volume control interface according to an embodiment of the disclosure.

Referring to FIG. 15A, the electronic device 201 according to various embodiments of the disclosure may display information 1510 about a plurality of external electronic devices connected to the electronic device 201 (e.g., the names of the external electronic devices). The electronic device 201 according to various embodiments of the disclosure may receive a user input for the information 1510 (e.g., "Buds") about the plurality of external electronic devices. The electronic device 201 according to various embodiments of the disclosure may display a menu 1520 for activating the dual audio function or operation according to the user input for the information 1510 (e.g., "Buds") about the plurality of external electronic devices. In the menu 1520 according to various embodiments of the disclosure, user interfaces 1522 and 1524 for activating the dual audio mode may be displayed. The electronic device 201 according to various embodiments of the disclosure may activate the dual audio function or operation through the user interfaces 1522 and 1524 for activating the dual audio function or operation. The electronic device 201 according to various embodiments of the disclosure may receive a seventh user input 1530 as illustrated in FIG. 15A. The electronic device 201 according to various embodiments of the disclosure may also activate the dual audio function or operation in response to the reception of the seventh user input 1530.

Referring to FIG. 15B, the electronic device 201 according to various embodiments of the disclosure may receive an eighth user input 1540 for the information 1510 (e.g., "Buds") about the plurality of external electronic devices. As illustrated in FIG. 15A, the electronic device 201 according to various embodiments of the disclosure may not display the user interfaces for controlling the volumes of the external electronic devices according to the reception of the eighth user input 1540.

An electronic device (e.g., the electronic device 201 of FIG. 2) according to various embodiments of the disclosure may include an audio module (e.g., the audio module 270 of FIG. 2), a communication module (e.g., the communication module 290 of FIG. 2) and a processor (e.g., the processor 220 of FIG. 2) operatively coupled to the audio module and the communication module. The processor may be configured to control the communication module to identify connection between the electronic device and a plurality of external electronic devices (e.g., the first external electronic device 202a and the second external electronic device 202b), identify an attribute of each of the plurality of external electronic devices connected to the electronic device, and control the audio module and the communication module to transmit audio data having a specified volume level to each of the plurality of external electronic devices according to the identified attributes of the plurality of external electronic devices.

According to various embodiments of the disclosure, the plurality of external electronic devices may include at least two of an electronic device that supports an external absolute volume feature or an external electronic device that does not support the absolute volume feature.

According to various embodiments of the disclosure, the processor may be further configured to control the audio module to transmit audio data having a first specified volume level and volume data about the external electronic device that does not support the absolute volume feature to the communication module.

According to various embodiments of the disclosure, the processor may be further configured to control the communication module to adjust the volume level of the audio data having the first specified volume level to a volume level corresponding to the volume data by using the volume data.

According to various embodiments of the disclosure, the specified volume level may include the first specified volume level and the adjusted volume level.

According to various embodiments of the disclosure, the first specified volume level may include a maximum volume level.

According to various embodiments of the disclosure, the plurality of external electronic devices may be operably connected to the electronic device through short-range communication.

According to various embodiments of the disclosure, the electronic device may further include a touch screen display, and the processor may be further configured to display a graphic interface for establishing connections with the plurality of external electronic devices together with information about the plurality of external electronic devices on the touch screen display.

According to various embodiments of the disclosure, the processor may be configured to display volume information about the external electronic device that supports the absolute volume feature and volume information about the external electronic device that does not support the absolute volume feature together on the touch screen display.

A method of controlling an electronic device (e.g., the electronic device 201 of FIG. 2) according to various embodiments of the disclosure may include identifying connection between the electronic device and a plurality of external electronic devices (e.g., the first external electronic device 202a and the second external electronic device 202b), identifying an attribute of each of the plurality of external electronic devices connected to the electronic device, and transmitting audio data having a specified volume level to each of the plurality of external electronic devices according to the identified attributes of the plurality of external electronic devices.

An electronic device (e.g., the electronic device 201 of FIG. 2) according to various embodiments of the disclosure may include an audio module (e.g., the audio module 270 of FIG. 2), a communication module (e.g., the communication module 290 of FIG. 2), and a processor operatively coupled to the audio module and the communication module. The processor may be configured to identify connection of a plurality of external electronic devices (e.g., the first external electronic device 202a and the second external electronic device 202b), identify a switching of a media volume synchronization function to an OFF state in a state where the plurality of external electronic devices are connected to the electronic device, change volume levels of the plurality of external electronic devices to a first volume level, change a volume level of the electronic device to a second volume level, and transmit audio data having the second volume level to each of the plurality of external electronic devices, in response to the identification of the switching of the media volume synchronization function to the OFF state.

According to various embodiments of the disclosure, the first volume level and the second volume level may be different.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a processor, and
   memory storing instructions that, when executed by the processor, cause the electronic device to:
   connect with a first external electronic device supporting an absolute volume feature,
   connect with a second external electronic device, not supporting the absolute volume feature, while the first external electronic device is connected to the electronic device while a media volume synchronization function is activated,
   identify an attribute of each of the first external electronic device and the second external electronic device, wherein the attribute is related with an absolute volume feature, and
   while the first external electronic device and the second external electronic device are connected to a communication module of the electronic device and the media volume synchronization function is activated, transmit audio data having a first volume level to the first external electronic device and the audio data having a second volume level to the second external electronic device, simultaneously, according to the attribute of the first external electronic device and the attribute of the second external electronic device.

2. The electronic device of claim 1, wherein the first volume level includes a maximum volume level.

3. The electronic device of claim 2, wherein the first external electronic device and the second external electronic device are connected to the electronic device through short-range communication.

4. A method comprising:
   connecting with a first external electronic device supporting an absolute volume feature;
   connecting with a second external electronic device, not supporting the absolute volume feature, while the first external electronic device is connected to an electronic device while a media volume synchronization function is activated;
   identifying an attribute of each of the first external electronic device and the second external electronic device, wherein the attribute is related with an absolute volume feature; and
   while the first external electronic device and the second external electronic device are connected to a communication module of the electronic device and the media volume synchronization function is activated, transmitting audio data having a first volume level to the first external electronic device and the audio data having a second volume level to the second external electronic device, simultaneously, according to the attribute of the first external electronic device and the attribute of the second external electronic device.

5. A non-transitory computer-readable recording medium storing a program executed on an electronic device, wherein the program comprises executable instructions that, when executed by a processor, cause the processor to:

connect with a first external electronic device supporting an absolute volume feature, connect with a second external electronic device, not supporting an absolute volume feature, while the first external electronic device is connected to the electronic device while a media volume synchronization function is activated, identify an attribute of each of the first external electronic device and the second external electronic device, wherein the attribute is related with an absolute volume feature, and while the first external electronic device and the second external electronic device are connected to a communication module of the electronic device and the media volume synchronization function is activated, transmit audio data having a first volume level to the first external electronic device and the audio data having a second volume level to the second external electronic device, simultaneously, according to the attribute of the first external electronic device and the attribute of the second external electronic device.

6. The non-transitory computer-readable recording medium of claim 5, wherein the first volume level includes a maximum volume level.

7. The non-transitory computer-readable recording medium of claim 6, wherein the first external electronic device and the second external electronic device are connected to the electronic device through short-range communication.

* * * * *